US009589149B2

(12) United States Patent
Livshits et al.

(10) Patent No.: US 9,589,149 B2
(45) Date of Patent: Mar. 7, 2017

(54) COMBINING PERSONALIZATION AND PRIVACY LOCALLY ON DEVICES

(71) Applicant: Microsoft Technology Licensing, LLC, Redmond, WA (US)

(72) Inventors: Benjamin Livshits, Kirkland, WA (US); Andrew Joseph Davidson, Madison, WI (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 0 days.

(21) Appl. No.: 13/689,785

(22) Filed: Nov. 30, 2012

(65) Prior Publication Data

US 2014/0157422 A1   Jun. 5, 2014

(51) Int. Cl.
   G06F 21/00   (2013.01)
   G06F 21/62   (2013.01)

(52) U.S. Cl.
   CPC .............................. G06F 21/6245 (2013.01)

(58) Field of Classification Search
   None
   See application file for complete search history.

(56) References Cited

U.S. PATENT DOCUMENTS

| | | | |
|---|---|---|---|
| 6,836,773 B2 | 12/2004 | Tamayo et al. | |
| 6,865,574 B1 | 3/2005 | McCullough | |
| 7,068,787 B1 * | 6/2006 | Ta | G06F 21/10 380/200 |
| 7,424,606 B2 * | 9/2008 | Lampson | G06F 9/4406 713/156 |
| 7,930,197 B2 | 4/2011 | Ozzie et al. | |
| 2001/0011247 A1 | 8/2001 | O'Fiaherty et al. | |
| 2002/0054084 A1 | 5/2002 | Udell | |
| 2002/0073075 A1 | 6/2002 | Dutta et al. | |
| 2002/0112048 A1 | 8/2002 | Gruyer et al. | |
| 2002/0143630 A1 | 10/2002 | Steinman et al. | |
| 2003/0101131 A1 | 5/2003 | Warren et al. | |
| 2003/0172090 A1 | 9/2003 | Asunmaa et al. | |
| 2005/0097595 A1 * | 5/2005 | Lipsanen | G06F 21/10 725/25 |
| 2005/0144448 A1 * | 6/2005 | England | G06F 21/606 713/168 |

(Continued)

OTHER PUBLICATIONS

Fredrikson, et al., "REPRIV: Re-Envisioning In-Browser Privacy", In: IEEE Symposium on Security and Privacy, 2011, 37 pages.*

(Continued)

*Primary Examiner* — Farid Homayounmehr
*Assistant Examiner* — Maung Lwin
(74) *Attorney, Agent, or Firm* — Sandy Swain; Alin Corie; Micky Minhas

(57) ABSTRACT

A profiling service may determine, local to a device, user profile attributes associated with a device user based on interaction of the device user with the device, based on device-local monitoring of device user interactions with the device, and may store the user profile attributes in a memory. The profiling service may be configured as an augmentation to a device operating system of the device. A profile exposure component may manage exposure of information associated with the user profile attributes to applications operating locally on the device, without exposure to the applications or to third parties of information determined as sensitive to the device user.

20 Claims, 13 Drawing Sheets

(56) References Cited

U.S. PATENT DOCUMENTS

| | | | |
|---|---|---|---|
| 2005/0165911 A1* | 7/2005 | Homiller | H04N 21/234327 709/219 |
| 2006/0224742 A1* | 10/2006 | Shahbazi | H04L 63/20 709/226 |
| 2007/0208730 A1 | 9/2007 | Agichtein et al. | |
| 2008/0072250 A1* | 3/2008 | Osorio | G06F 21/10 725/34 |
| 2008/0082393 A1 | 4/2008 | Ozzie et al. | |
| 2008/0104030 A1 | 5/2008 | Choi et al. | |
| 2008/0259906 A1 | 10/2008 | Shkedi | |
| 2008/0319918 A1 | 12/2008 | Forlai | |
| 2009/0037279 A1* | 2/2009 | Chockalingam | G06Q 30/02 705/14.1 |
| 2009/0055270 A1 | 2/2009 | Magdon-Ismail et al. | |
| 2009/0177529 A1 | 7/2009 | Hadi | |
| 2009/0234708 A1* | 9/2009 | Heiser, II | G06Q 30/02 705/14.17 |
| 2009/0248494 A1 | 10/2009 | Hueter et al. | |
| 2009/0248583 A1* | 10/2009 | Chhabra | G06Q 20/10 705/76 |
| 2009/0327041 A1 | 12/2009 | Flake et al. | |
| 2010/0162365 A1* | 6/2010 | Del Real | G06F 21/6218 726/4 |
| 2010/0299187 A1* | 11/2010 | Duggal | G06Q 10/10 705/14.1 |
| 2010/0306773 A1* | 12/2010 | Lee | G06F 9/5077 718/1 |
| 2011/0023129 A1 | 1/2011 | Vernal et al. | |
| 2011/0083013 A1* | 4/2011 | Nice et al. | 713/168 |
| 2011/0218866 A1* | 9/2011 | Wilson | 705/14.73 |
| 2011/0231225 A1 | 9/2011 | Winters | |
| 2011/0238496 A1* | 9/2011 | Gurbuxani et al. | 705/14.49 |
| 2011/0258593 A1 | 10/2011 | Ng et al. | |
| 2011/0264581 A1 | 10/2011 | Clyne | |
| 2011/0283363 A1* | 11/2011 | Verschoor et al. | 726/26 |
| 2012/0030018 A1 | 2/2012 | Passmore et al. | |
| 2012/0047530 A1 | 2/2012 | Shkedi | |
| 2012/0069131 A1* | 3/2012 | Abelow | G06Q 10/067 348/14.01 |
| 2012/0136941 A1 | 5/2012 | Howes et al. | |
| 2012/0158516 A1* | 6/2012 | Wooten et al. | 705/14.66 |
| 2012/0166380 A1 | 6/2012 | Sridharan et al. | |
| 2012/0167189 A1 | 6/2012 | Aichroth et al. | |
| 2012/0297017 A1 | 11/2012 | Livshits et al. | |
| 2012/0323794 A1 | 12/2012 | Livshits | |

OTHER PUBLICATIONS

Livshits, Benjamin., "MoRePriv", Retrieved at <<http://research.microsoft.com/en-us/projects/morepriv/>>, Retrieved Date: Sep. 4, 2012, pp. 2.

Livshits, Benjamin., "RePriv", Retrieved at <<http://research.microsoft.com/en-us/projects/repriv/>>, Retrieved Date: Sep. 4, 2012, pp. 2.

Jakobsson, et al., "Privacy-Preserving History Mining for Web Browsers", Retrieved Sep. 4, 2012 at <<http://www.ravenwhite.com/files/pphm.pdf>>, In Web 2.0 Security and Privacy, May 2008, pp. 7.

"Android-Apktool", Retrieved at <<http://code.google.com/p/android-apktool/>>, Retrieved Date: Sep. 3, 2012, pp. 2.

Davidson, et al., "MoRePriv: Mobile OS Support for Application Personalization and Privacy", Retrieved Sep. 4, 2012 at <<http://research.microsoft.com/pubs/163596/MSR-TR.pdf>>, In Microsoft Technical Report, MSR-TR-2012-50, May 3, 2012, pp. 17.

Backes, et al., "ObliviAd: Provably Secure and Practical Online Behavioral Advertising", Retrieved Sep. 4, 2012 at <<http://ieeexplore.ieee.org/stamp/stamp.jsp?tp=&arnumber=6234417>>, In IEEE Symposium on Security and Privacy, May 20, 2012, pp. 15.

Ball, et al., "Thorough Static Analysis of Device Drivers", Retrieved Sep. 4, 2012 at <<http://research.microsoft.com/pubs/74567/eurosys2006.pdf>>, In Proceedings of the 1st ACM SIGOPS/EuroSys European Conference on Computer Systems, Apr. 18, 2006, pp. 14.

Egele, et al., "PiOS: Detecting Privacy Leaks in iOS Applications", Retrieved Sep. 4, 2012 at <<http://iseclab.org/papers/egele-ndss11.pdf>>, In Proceedings of the 18th Annual Network & Distributed System Security Symposium, Feb. 6, 2011, pp. 15.

Enck, et al., "TaintDroid: An Information-Flow Tracking System for Realtime Privacy Monitoring on Smartphones", Retrieved Sep. 4, 2012 at <<http://static.usenix.org/events/osdi10/tech/full_papers/Enck.pdf>>, In Proceedings of the 9th USENIX Conference on Operating Systems Design and Implementation, Oct. 4, 2010, pp. 15.

Fredrikson, et al., "REPRIV: Re-Envisioning In-Browser Privacy", Retrieved Sep. 4, 2012 at <<http://research.microsoft.com/pubs/137038/tr.pdf>>, In Proceedings of IEEE Symposium on Security and Privacy, May 22, 2011, pp. 37.

Grace, et al., "Unsafe Exposure Analysis of Mobile In-App Advertisements", Retrieved Sep. 4, 2012 at <<http://www.csc.ncsu.edu/faculty/jiang/pubs/WISEC12_ADRISK.pdf>>, In Proceedings of the Fifth ACM Conference on Security and Privacy in Wireless and Mobile Networks, Apr. 16, 2012, pp. 12.

Guha, et al., "Verified Security for Browser Extensions", Retrieved Sep. 4, 2012 at <<http://ieeexplore.ieee.org/stamp/stamp.jsp?tp=&arnumber=5958025, In IEEE Symposium on Security and Privacy, May 22, 2011, pp. 16.

Guha, et al., "Privad: Practical Privacy in Online Advertising", Retrieved Sep. 4, 2012 at <<http://static.usenix.org/event/nsdi11/tech/full_papers/Guha.pdf>>, In Proceedings of the 8th USENIX Conference on Networked Systems Design and Implementation, Mar. 30, 2011, pp. 14.

Guha, et al., "Serving Ads from Localhost for Performance, Privacy, and Profit", Retrieved Sep. 4, 2012 at <<http://adresearch.mpi-sws.org/privad-workshop.pdf>>, In Proceedings of the 8th Workshop on Hot Topics in Networks, Oct. 22, 2009, pp. 6.

Han, et al., "A Study of Third-Party Tracking by Mobile Apps in the Wild", Retrieved Sep. 4, 2012 at <<http://www.cs.washington.edu/education/grad/UW-CSE-12-03-01.PDF>>, In Technical Report, University of Washington, Mar. 2012, pp. 15.

Hornyack, et al., "These Aren't the Droids You're Looking for: Retrofitting Android to Protect Data from Imperious Applications", Retrieved Sep. 4, 2012 at <<http://appfence.org/ccs210-hornyack.pdf>>, In Proceedings of the 18th ACM Conference on Computer and Communications Security, Oct. 17, 2011, pp. 13.

Watson, T.J., "Watson Libraries for Analysis", Retrieved Sep. 4, 2012 at <<http://wala.sourceforge.net/wiki/index.php/Main_Page>>, Retrieved Date: Sep. 3, 2012, pp. 2.

Jeon, et al., "Dr Android and Mr Hide: Fine-grained Security Policies on Unmodified Android", Retrieved Sep. 4, 2012 at <<http://www.cs.umd.edu/~jfoster/papers/cs-tr-5006.pdf>>, In Technical Report CS-TR-5006, Dec. 9, 2011, pp. 14.

Juels, Ari., "Targeted Advertising . . . and Privacy Too", Retrieved Sep. 4, 2012 at <<http://www.rsa.com/rsalabs/staff/bios/ajuels/publications/ad_privacy/ad_privacy.ps>>, In Proceedings of the Conference on Topics in Cryptology, Apr. 8, 2001, pp. 16.

Kobsa, Alfred., "Privacy-Enhanced Personalization", Retrieved Sep. 4, 2012 at <<http://www.crito.uci.edu/papers/2007/Privacy-EnhancedPersonalization.pdf>>, In Communications of the ACM, vol. 50, Issue 8, Aug. 2007, pp. 13.

Kobsa, et al., "Privacy Through Pseudonymity in User-Adaptive Systems", Retrieved Sep. 4, 2012 at <<http://www.win.tue.nl/~laroyo/2L340/resources/p149-kobsa.pdf>>, In ACM Transactions on Internet Technology, vol. 3, No. 2, May 2003, pp. 35.

Lam, et al., "Summary Thumbnails: Readable Overviews for Small Screen Web Browsers", Retrieved Sep. 4, 2012 at <<http://citeseerx.ist.psu.edu/viewdoc/download?doi=10.1.1.129.7996&rep=rep1&type=pdf>>, In Proceedings of the SIGCHI Conference on Human Factors in Computing Systems, Apr. 2, 2005, pp. 10.

Livshits, et al., "Merlin: Specification Inference for Explicit Information Flow Problems", Retrieved Sep. 4, 2012 at <<http://software.imdea.org/~ab/Publications/livshitsNRB_pldi09.pdf>>, In Proceedings of the ACM SIGPLAN Conference on Programming Language Design and Implementation, Jun. 15, 2009, pp. 12.

(56) References Cited

OTHER PUBLICATIONS

Mayer, et al., "Third-Party Web Tracking: Policy and Technology", Retrieved Sep. 4, 2012 at <<http://ieeexplore.ieee.org/stamp/stamp.jsp?tp=&arnumber=6234427>>, In Proceedings of the IEEE Symposium on Security and Privacy, May 20, 2012, pp. 15.

Pearce, et al., "AdDroid: Privilege Separation for Applications and Advertisers in Android", Retrieved Sep. 4, 2012 at <<http://www.cs.berkeley.edu/~pearce/papers/addroid_asiaccs_2012.pdf>>, In Proceedings of AsiaCCS, May 2, 2012, pp. 11.

Felt, et al., "Android Permissions Demystified", Retrieved Sep. 4, 2012 at <<http://www.cs.berkeley.edu/~afelt/android_permissions.pdf>>, In Proceedings of the 18th ACM Conference on Computer and Communications Security, Oct. 17, 2011, pp. 11.

Rich, Elaine., "User Modeling via Stereotypes", Retrieved Sep. 4, 2012 at <<http://www.cs.utexas.edu/users/ear/CogSci.pdf>>, In Cognitive Science, vol. 3, Oct. 1979, pp. 18.

Shekhar, et al., "AdSplit: Separating Smartphone Advertising from Applications", Retrieved Sep. 4, 2012 at <<http://arxiv.org/pdf/1202.4030.pdf>>, In Proceedings of CoRR, Feb. 17, 2012, pp. 15.

Toubiana, et al., "Adnostic: Privacy Preserving Targeted Advertising", Retrieved Sep. 4, 2012 at <<http://www.nyu.edu/pages/projects/nissenbaum/papers/adnostic.pdf>>, In Proceedings of the Network and Distributed System Security Symposium, Feb. 28, 2010, pp. 21.

Livshits, et al., "Privacy-Conscious Personalization", U.S. Appl. No. 13/112,244, filed May 20, 2011, pp. 44.

Dhar et al., "Challenges and Business Models for Mobile Location-based Services and Advertising", Retrieved Nov. 30, 2012 at <<http://cmapspublic3.ihmc.us/rid=1JV7F824C-VLXCF5-SZ4/business_models.pdf>>, In Communications of the ACM, vol. 54, No. 5 (May 2011), pp. 121-129.

Livshits, Benjamin, "Monetization Strategies in Privacy-Conscious Personalization," U.S. Appl. No. 13/160,726, filed Jun. 15, 2011, pp. 54.

"Skin (computing)", Retrieved Nov. 30, 2012 at <<http://en.wikipedia.org/wiki/Skin_(computing)>>, From Wikipedia, 3 pages.

Office Action mailed Apr. 25, 2013 for U.S. Appl. No. 13/112,244, Livshits, et al., entitled "Privacy-Conscious Personalization," filed May 20, 2011, 23 pages.

Response filed Aug. 26, 2013, in response to Office Action mailed Apr. 25, 2013 for U.S. Appl. No. 13/112,244, Livshits et al., entitled "Privacy-Conscious Personalization," filed May 20, 2011, 12 pages.

Office Action mailed Nov. 20, 2013 for U.S. Appl. No. 13/112,244, Livshits et al., entitled "Privacy-Conscious Personalization," filed May 20, 2011, 29 pages.

Response filed May 18, 2014, in response to Office Action mailed Nov. 20, 2013 for U.S. Appl. No. 13/112,244, Livshits et al., entitled "Privacy-Conscious Personalization," filed May 20, 2011, 12 pages.

Office Action mailed Aug. 14, 2014 for U.S. Appl. No. 13/112,244, Livshits et al., entitled "Privacy-Conscious Personalization," filed May 20, 2011, 20 pages.

Response filed Jan. 14, 2015, in response to Office Action mailed Aug. 14, 2014 for U.S. Appl. No. 13/112,244, Livshits et al., entitled "Privacy-Conscious Personalization," filed May 20, 2011, 10 pages.

Office Action mailed Jul. 30, 2012 for U.S. Appl. No. 13/160,726, Livshits, Benjamin, entitled "Monetization Strategies in Privacy-Conscious Personalization," filed Jun. 15, 2011, 14 pages.

Response filed Oct. 30, 2012, in response to Office Action mailed Jul. 30, 2012 for U.S. Appl. No. 13/160,726, Livshits, Benjamin, entitled "Monetization Strategies in Privacy-Conscious Personalization," filed Jun. 15, 2011, 10 pages.

Office Action mailed Nov. 16, 2012 for U.S. Appl. No. 13/160,726, Livshits, Benjamin, entitled "Monetization Strategies in Privacy-Conscious Personalization," filed Jun. 15, 2011, 15 pages.

Response filed Apr. 13, 2013, in response to Office Action mailed Nov. 16, 2012 for U.S. Appl. No. 13/160,726, Livshits, Benjamin, entitled "Monetization Strategies in Privacy-Conscious Personalization," filed Jun. 15, 2011, 9 pages.

Office Action mailed Apr. 30, 2013 for U.S. Appl. No. 13/160,726, Livshits, Benjamin, entitled "Monetization Strategies in Privacy-Conscious Personalization," filed Jun. 15, 2011, 20 pages.

Response filed Oct. 30, 2013, in response to Office Action mailed Apr. 30, 2013 for U.S. Appl. No. 13/160,726, Livshits, Benjamin, entitled "Monetization Strategies in Privacy-Conscious Personalization," filed Jun. 15, 2011, 7 pages.

Office Action mailed Nov. 29, 2013 for U.S. Appl. No. 13/160,726, Livshits, Benjamin, entitled "Monetization Strategies in Privacy-Conscious Personalization," filed Jun. 15, 2011, 17 pages.

Response filed May 29, 2014, in response to Office Action mailed Nov. 29, 2013 for U.S. Appl. No. 13/160,726, Livshits, Benjamin, entitled "Monetization Strategies in Privacy-Conscious Personalization," filed Jun. 15, 2011, 8 pages.

Office Action mailed Jul. 11, 2014 for U.S. Appl. No. 13/160,726, Livshits, Benjamin, entitled "Monetization Strategies in Privacy-Conscious Personalization," filed Jun. 15, 2011, 26 pages.

Abascal, et al., "Data Mining based User Modeling Systems for Web Personalization applied to people with disabilities", Retrieved at <<http://www.davidroihardoon.com/AMD09/Schedule_files/UPV%20EHU%20DMforPWD.pdf>>, Jan. 19, 2010, pp. 4.

Jakobsson, et al., "Privacy Preserving History Mining for Web Browsers", Retrieved at <<http://www.ravenwhite.com/files/pphm.pdf>>, Jan. 1, 2010, pp. 7.

Forsati, et al., "Web Page Personalization based on Weighted Association Rules", Retrieved at <<http://ieeexplore.ieee.org/stamp/stamp.jsp?tp=&arnumber=4795935>>, In the Proceedings International Conference on Electronic Computer Technology, Feb. 26, 2009, pp. 130-135.

Guha, et al., "Serving Ads from Localhost for Performance, Privacy, and Profit", Retrieved at <<http://adresearch.mpi-sws.org/privad-workshop.pdf>>, In the Proceedings of Hot Topics in Networking, Oct. 2009, pp. 6.

Howe, et al., "TrackMeNot: Resisting Surveillance in Web Search", Retrieved at <<http://www.nyu.edu/projects/nissenbaum/papers/HoweNissTMN.2.8d.pdf>>, 2008, pp. 1-23.

Jackson, et al., "Protecting Browser State from Web Privacy Attacks", Retrieved at <<http://citeseerx.ist.psu.edu/viewdoc/download?doi=10.1.1.75.4136&rep=rep1&type=pdf>>, In the Proceedings of the 15th international conference on World Wide Web, May 23-26, 2006, pp. 8.

Gabber, et al., "How to Make Personalized Web Browsing Simple, Secure, and Anonymous", Retrieved at <<http://citeseerx.ist.psu.edu/viewdoc/download?doi=10.1.1.122.8278&rep=rep1&type=pdf>>, Proceedings in Financial Cryptography, 1997, pp. 16.

Janc, et al., "Feasability and Real-World Implications of Web Browser History Detection", Retrieved at <<http://w2spconf.com/2010/papers/p26.pdf>>, 2010, pp. 8.

Koren, Yehuda, "Factor in the Neighbors: Scalable and Accurate Collaborative Filtering", Retrieved at <<http://public.research.att.com/~volinsky/netflix/factorizedNeighborhood.pdf>>, Journal ACM Transactions on Knowledge Discovery from Data, Jan. 2010, vol. 4, Issue 1, pp. 11.

McCamant, et al., "Quantitative Information Flow as Network Flow Capacity", Retrieved at <<http://groups.csail.mit.edu/pag/pubs/secret-max-flow-pldi2008.pdf>>, In the Proceedings of the 2008 ACM SIGPLAN conference on Programming language design and implementation, Jun. 7-13, 2008, pp. 1-13.

McDonald, et al., "A Comparative Study of Online Privacy Policies and Formats", Retrieved at <<http://lorrie.cranor.org/pubs/authors-version-PETS-formats.pdf>>, In the Proceedings of the 9th International Symposium on Privacy Enhancing Technologies, pp. 19.

McKinley, Katherine, "Cleaning up after Cookies Version 1.0", Retrived at <<http://www.isecpartners.com/storage/white-papers/iSEC_Cleaning_Up_After_Cookies.pdf>>, Dec. 31, 2008, pp. 1-12.

McSherry, et al., "Differentially Private Recommender Systems: Building Privacy into the Net", Retrieved at <<http://research.microsoft.com/pubs/80511/NetflixPrivacy.pdf>>, In the Proceedings of the 15th ACM SIGKDD international conference on Knowledge discovery and data mining, Jun. 28-Jul. 1, 2009, pp. 9.

(56) References Cited

OTHER PUBLICATIONS

"Amazon Mechanical Turk", Retrieved at <<https://www.mturk.com/mturk/welcome>>, Retrieved Date: Feb. 21, 2011, p. 1.
Narayanan, et al., "Robust De-Anonymization of Large Sparse Datasets", Retrieved at <<http://ieeexplore.ieee.org/stamp/stamp.jsp?tp=&arnumber=4531148>>, In the Proceedings of the IEEE Symposium on Security and Privacy, 2008, pp. 111-125.
Narayanan, et al., "De-Anonymizing Social Networks", Retrieved at <<http://ieeexplore.ieee.org/stamp/stamp.jsp?tp=&arnumber=5207644>>, In the Proceedings of 30th IEEE Symposium on Security and Privacy, 2009, pp. 173-187.
"The Open Directory Project", Retrieved at <<http://dmoz.org>>, Retrieved Date: Feb. 21, 2011, p. 1.
Pierrakos, et al., "Web Usage Mining as a Tool for Personalization: A Survey", Retrieved at <<http://citeseerx.ist.psu.edu/viewdoc/download?doi=10.1.1.83.1398&rep=rep1&type=pdf>>, Journal of User Modeling and User-Adapted Interaction, vol. 13, Issue 4, Nov. 2003, pp. 311-372.
Provost, et al., "Audience Selection for On-line Brand Advertising: Privacy-Friendly Social Network Targeting", Retrieved at <<http://www.adsafemedia.com/pdf/Audience_Selection.pdf>>, In the Proceedings of the 15th ACM SIGKDD international conference on Knowledge discovery and data mining, Jun. 28-Jul. 1, 2009, pp. 9.
"Same Origin Policy: Protecting Browser State from Web Privacy Attacks", Retrieved at <<http://crypto.stanford.edu/safecache/>>, Retrieved Date: Feb. 21, 2011, pp. 2.
Swamy, et al. "Enforcing Stateful Authorization and Information Flow Policies in Fine", Retrieved at <<http://research.microsoft.com/pubs/115445/techreport.pdf>>, Jan. 20, 2010, pp. 1-37.
"TargetAPI", Retrieved at <<http://www.targetapi.com>>, Retrieved Date: Feb. 21, 2011, p. 1.
"The Mozilla Team. Plugging the CSS History Leak", Retrieved at <<http://blog.mozilla.com/security/2010/03/31/plugging-the-css-history-leak>>, Mar. 31, 2010, pp. 16.
Toubiana, et al., "Adnostic: Privacy Preserving Targeted Advertising", Retrieved at <<http://crypto.stanford.edu/adnostic/adnostic.pdf>>, 2010, pp. 1-23.
"WebMii: A Person Search Engine", Retrieved at <<http://www.webmii.com>>, Retrieved Date: Feb. 21, 2011, p. 1.
Wondracek, et al., "A Practical Attack to De-anonymize Social Network Users", Retrieved at <<http://ieeexplore.ieee.org/stamp/stamp.jsp?tp=&arnumber=5504716>>, In the Proceedings of IEEE Symposium on Security and Privacy, May 16-19, 2010, pp. 223-238.
"Yahoo! Boss API", Retrieved at <<http://developer.yahoo.com/search/boss/>>, Retrieved Date: Feb. 21, 2011, pp. 3.
"The Yahoo Toolbar", Retrieved at <<http://toolbar.yahoo.com>>, Retrieved Date: Feb. 21, 2011, p. 1.
Zhan, et al., "Privacy-Preserving Collaborative Data Mining", Retrieved at <<http://ieeexplore.ieee.org/stamp/stamp.jsp?arnumber=04490259>>, 2006, pp. 9.
Morgenstern, et al., "Security-Typed Programming within Dependently Typed Programming," International Conference on Functional Programming (ICFP'10), Sep. 27-29, 2010, pp. 169-180.
Wang, et al., "Performance Evaluation of a Privacy-Enhancing Framework for Personalized Websites", Retrieved at <<http://www.ics.uci.edu/~kobsa/papers/2009-UMAP-kobsa.pdf>>, Proceedings of the 17th International Conference on User Modeling, Personalization and Adaptation, 2009, pp. 12.
Kolias, et al., "Enhancing User Privacy in Adaptive Web Sites with Client-side user Profiles", Retrieved at <<http://www.icsd.aegean.gr/publication_files/conference/266433409.pdf>>, Third International Workshop on Semantic Media Adaptation and Personalization, Dec. 15-16, 2008, pp. 170-176.
Kobsa, Alfred., "Privacy-Enhanced Web Personalization", Retrieved at <<http://citeseerx.ist.psu.edu/viewdoc/download?doi=10.1.1.77.9723&rep=rep1&type=pdf>>, 2007, pp. 45.
Brar, et al., "Privacy and Security in Ubiquitous Personalized Applications", Retrieved at <<http://citeseerx.ist.psu.edu/viewdoc/download?doi=10.1.1.113.8114&rep=rep1&type=pdf>>, Nov. 2004, pp. 1-8.
Teltzrow, et al., "Impacts of User Privacy Preferences on Personalized Systems a Comparative Study", Retrieved at <<http://citeseerx.ist.psu.edu/viewdoc/download?doi=10.1.1.10.8180&rep=rep1&type=pdf>>, 2004, pp. 1-18.
Cassel, et al., "Client Side Personalization", Retrieved at <<http://www.ercim.eu/publication/ws-proceedings/DelNoe02/CasselWolz.pdf>>, DELOS Workshop: Personalisation and Recommender Systems in Digital Libraries, 2001, pp. 5.
Office Action mailed May 7, 2015 for U.S. Appl. No. 13/112,244, Livshits et al., entitled "Privacy-Conscious Personalization," filed May 20, 2011, 25 pages.
Das, et al., "Google News Personalization: Scalable Online Collaborative Filtering", In the Proceedings of the 16th International Conference on World Wide Web (WWW 2007), May 8-12, 2007, pp. 271-280.
Ratnakumar, Jebaraj A., "An Implementation of Web Personalization using Web Mining Techniques", Retrieved at <<http://www.jatit.org/volumes/research-papers/Vol18No1/10Vol18No1.pdf>>, In the Proceedings of Journal of Theoretical and Applied Information Technology, 2005, pp. 67-73.
Aggarwal, et al., "An Analysis of Private Browsing Modes in Modern Browsers", Retrieved at <<http://www.collinjackson.com/research/private-browsing.pdf>>, In the Proceedings of the 19th Usenix Security Symposium, 2010, pp. 15.
"The Alexa Toolbar", Retrieved at <<http://alexa.com/toolbar>>, Retrieved Date: Feb. 18, 2011, p. 1.
Becker, et al., "Measuring Privacy Risk in Online Social Networks", Retrieved at <<http://w2spconf.com/2009/papers/s2p2.pdf>>, 2009, pp. 8.
"The Bing Toolbar", Retrieved at <<http://www.discoverbing.com/toolbar>>, Retrieved Date: Feb. 18, 2011, pp. 2.
Das, et al., "Google News Personalization: Scalable Online Collaborative Filtering", Retrieved at <<http://www.google.co.uk/url?sa=t&source=web&cd=1&ved=0CCIQFjAA&url=http%3A%2F%2Fciteseerx.ist.psu.edu%2Fviewdoc%2Fdownload%3Fdoi%3D10.1.1.80.4329%26rep%3Drep1%26type%3Dpdf&ei=WeNhTdPqLNKU4AaB_J29CQ&usq=AFQiCNH1vmapBdwdNl-vnOuHKda9vFUO2Q>>, In the Proceedings "WWW '07 Proceedings", pp. 271-280, May 2007.
Dwork, Cynthia, "Differential Privacy: a Survey of Results", Retrieved at <<http://www.utdallas.edu/~muratk/courses/crypto-for-dbsec10s_files/differential-privacy-survey.pdf>>, In the Proceedings of the 5th international conference on Theory and applications of models of computation 2008, pp. 1-19.
Eckersley, Peter, "How Unique is your Web Browser?", Retrieved at <<https://panopticlick.eff.org/browser-uniqueness.pdf>>, 2010, pp. 1-19.
Freudiger, et al., "Towards Privacy-Friendly Online Advertising", Retrieved at <<http://w2spconf.com/2009/papers/s2p1.pdf>>, May 21, 2009, pp. 1-8.
"Google AdSense Privacy Information", Retrieved at <<http://www.google.com/privacy_ads.html#toc-faq>>, Retrieved Date: Feb. 21, 2011, pp. 5.
"The Google Toolbar", Retrieved at <<http://toolbar.google.com>>, Retrieved Date: Feb. 21, 2011, p. 1.

* cited by examiner

| News topic | Activist | Bachelor | Business Exec | Football Dad | Retiree | Soccer Mom | Technophile | Tween |
|---|---|---|---|---|---|---|---|---|
| Health | 3 | 3 | 4 | 4 | 10 | 7 | 2 | 1 |
| Tech | 4 | 6 | 5 | 5 | 3 | 4 | 10 | 8 |
| US | 9 | 4 | 7 | 6 | 6 | 4 | 3 | 2 |
| Business | 4 | 5 | 10 | 5 | 5 | 2 | 6 | 1 |
| World | 7 | 2 | 4 | 1 | 2 | 2 | 2 | 1 |
| Entertainment | 0 | 7 | 3 | 4 | 4 | 6 | 5 | 5 |
| Science | 2 | 3 | 3 | 1 | 3 | 2 | 6 | 4 |
| Society | 6 | 3 | 2 | 2 | 3 | 3 | 2 | 3 |
| Politics | 10 | 4 | 6 | 5 | 5 | 3 | 2 | 1 |
| Sports | 0 | 7 | 4 | 10 | 4 | 2 | 5 | 7 |

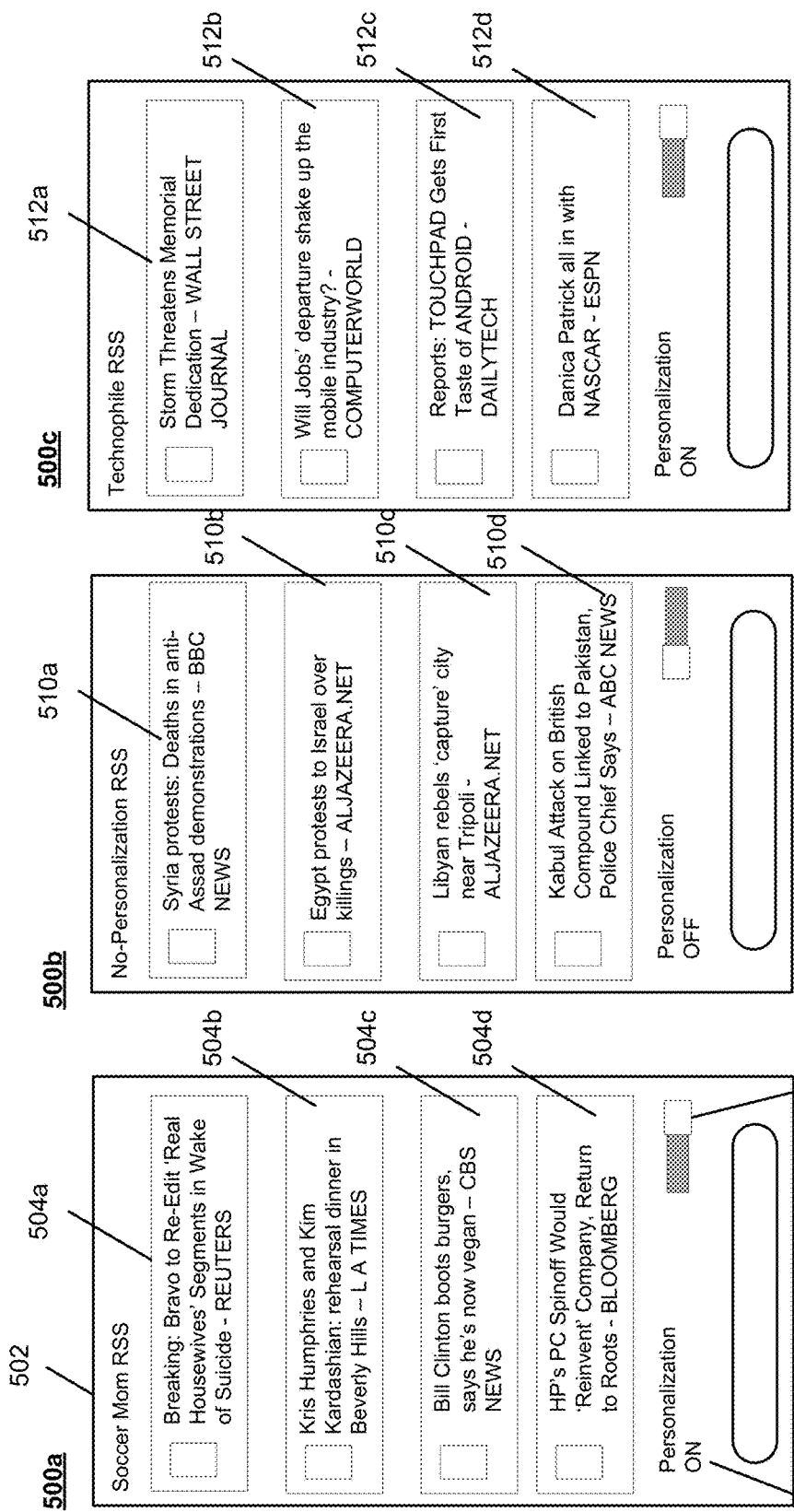

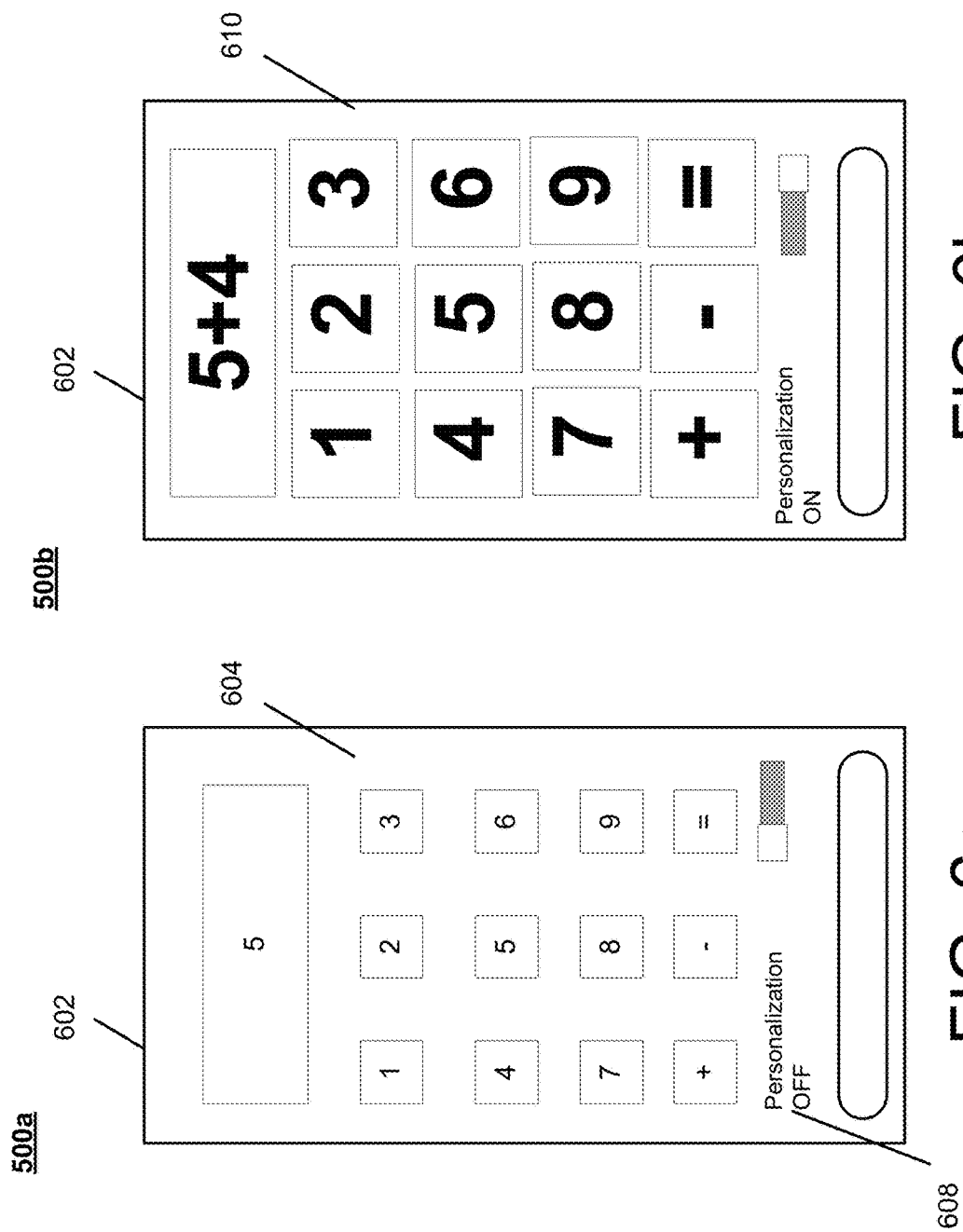

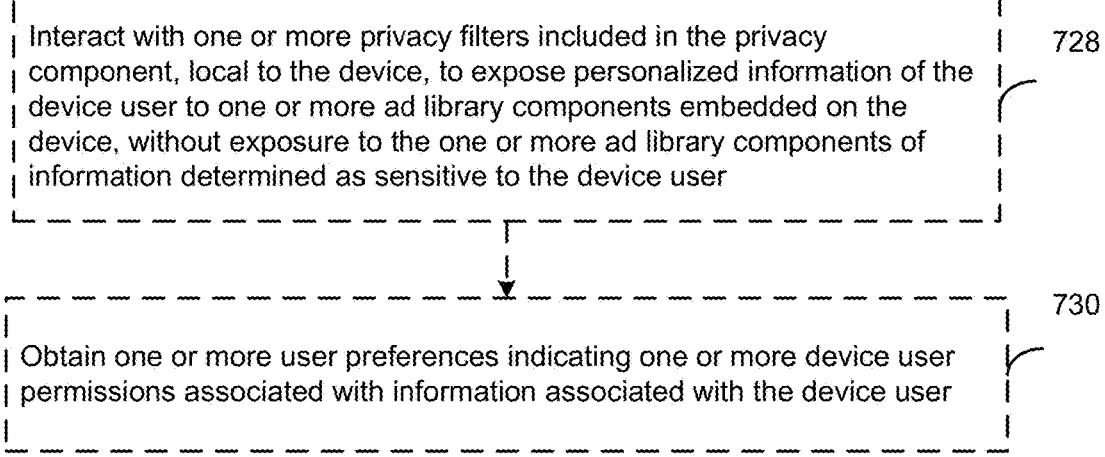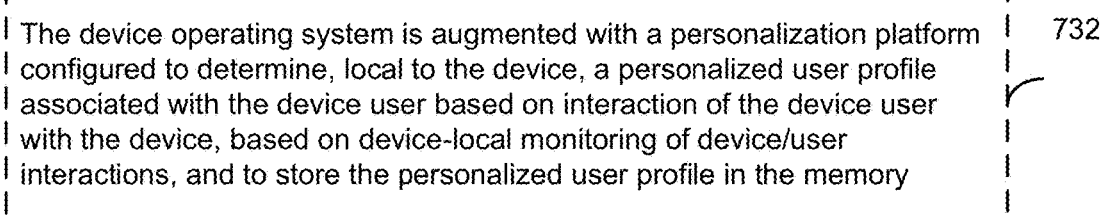
FIG. 7d

COMBINING PERSONALIZATION AND PRIVACY LOCALLY ON DEVICES

BACKGROUND

Electronic devices (including mobile devices) are becoming increasingly personalized, fluidly adapting themselves to the needs and preferences of their users. For example, with location-based personalization, search engine results and yellow pages restaurant recommendations may become more relevant when the relevant application knows the user's location. Other examples of mobile personalization may include applications such as customizable news delivery applications (e.g., AOL EDITIONS (editions.com) and FLIPBOARD (flipboard.com)). Much work in personalization has taken the form of aggregating user data in the cloud, then using it for large-scale data mining.

SUMMARY

According to one general aspect, a system may include a device that includes at least one processor. The device may include a localized privacy engine comprising instructions tangibly embodied on a computer readable storage medium for execution by the at least one processor. The localized privacy engine may include a profiling service configured to determine, local to the device, user profile attributes associated with a device user based on interaction of the device user with the device, based on device-local monitoring of device user interactions with the device, and to store the user profile attributes in a memory. The profiling service may be configured as an augmentation to a device operating system of the device. A profile exposure component may be configured to manage exposure of information associated with the user profile attributes to one or more applications operating locally on the device, without exposure to the applications or to third parties of information determined as sensitive to the device user.

According to another aspect, a personalized user profile associated with a device user may be determined, local to the device, based on interaction of the device user with the device, based on device-local monitoring of device operating system activities, and the personalized user profile may be stored in a memory, via a personalization platform configured as an augmentation to a device operating system. Exposure of the personalized user profile to one or more applications operating locally on the device may be managed, without exposure to the applications of information determined as sensitive to the device user.

According to another aspect, a computer program product tangibly embodied on a computer-readable storage medium may include executable code that may cause at least one data processing apparatus to determine, via a device processor, local to a device, user profile attributes associated with a device user based on interaction of the device user with the device, based on device-local monitoring of device operating system activities associated with actions of the device user. Further, the at least one data processing apparatus may store the user profile attributes in a memory. Further, the at least one data processing apparatus may expose personalization information of the device user to one or more ad library components embedded on the device, without exposure to the one or more ad library components of information determined as sensitive to the device user, via interaction with one or more privacy filters, local to the device.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. The details of one or more implementations are set forth in the accompanying drawings and the description below. Other features will be apparent from the description and drawings, and from the claims.

DRAWINGS

Figure 3:
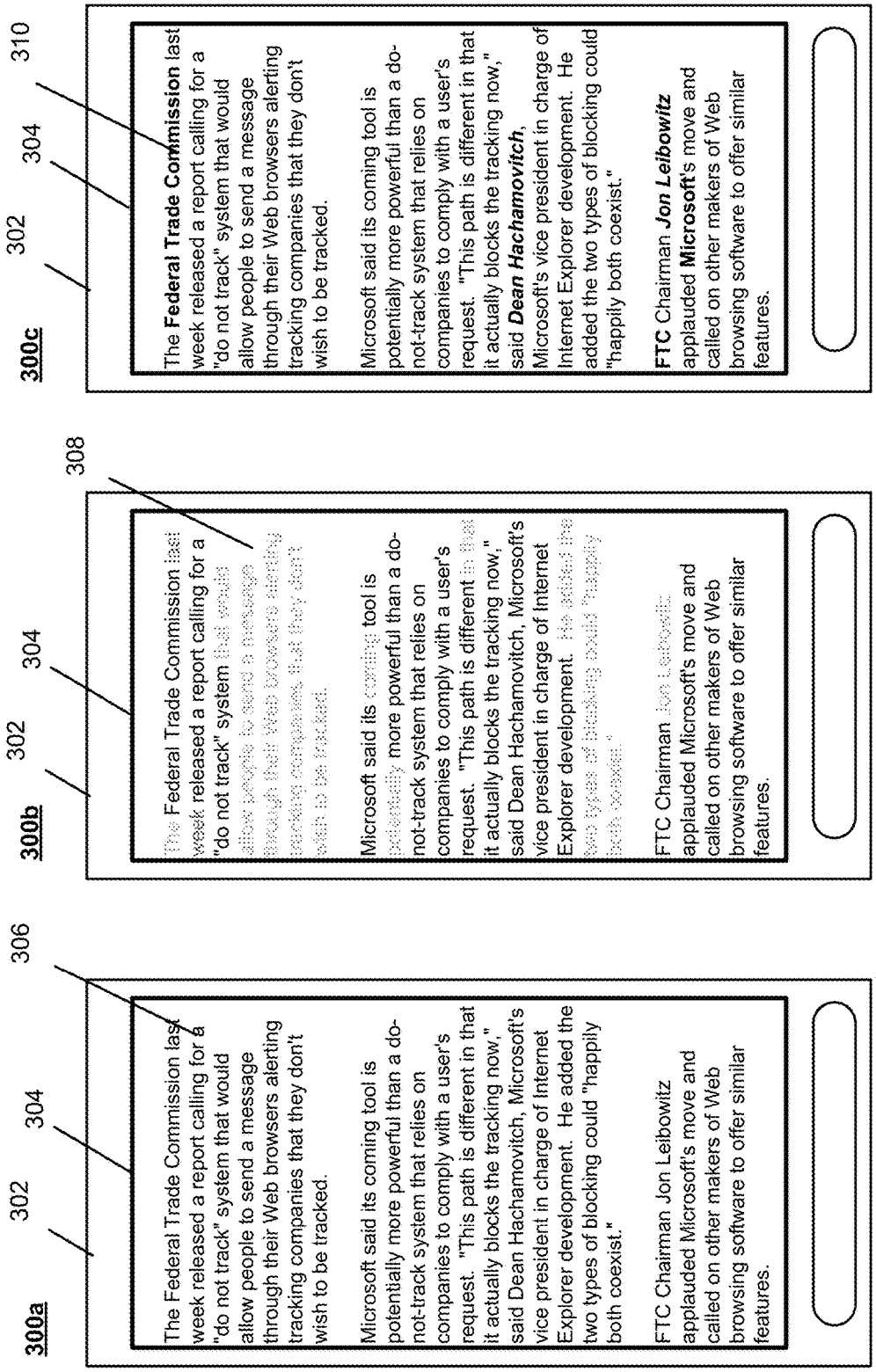

FIGS. 3*a*-3*c* depict example user views of example personalized presentations of text.

FIG. 4 depicts an example table storing relevance values of news topics associated with personas.

FIGS. 5*a*-5*c* depict example user views of example personalized presentations of Rich Site Summary (RSS) feeds.

FIGS. 6*a*-6*b* depict example user views of example personalized application interfaces.

Figure 1:
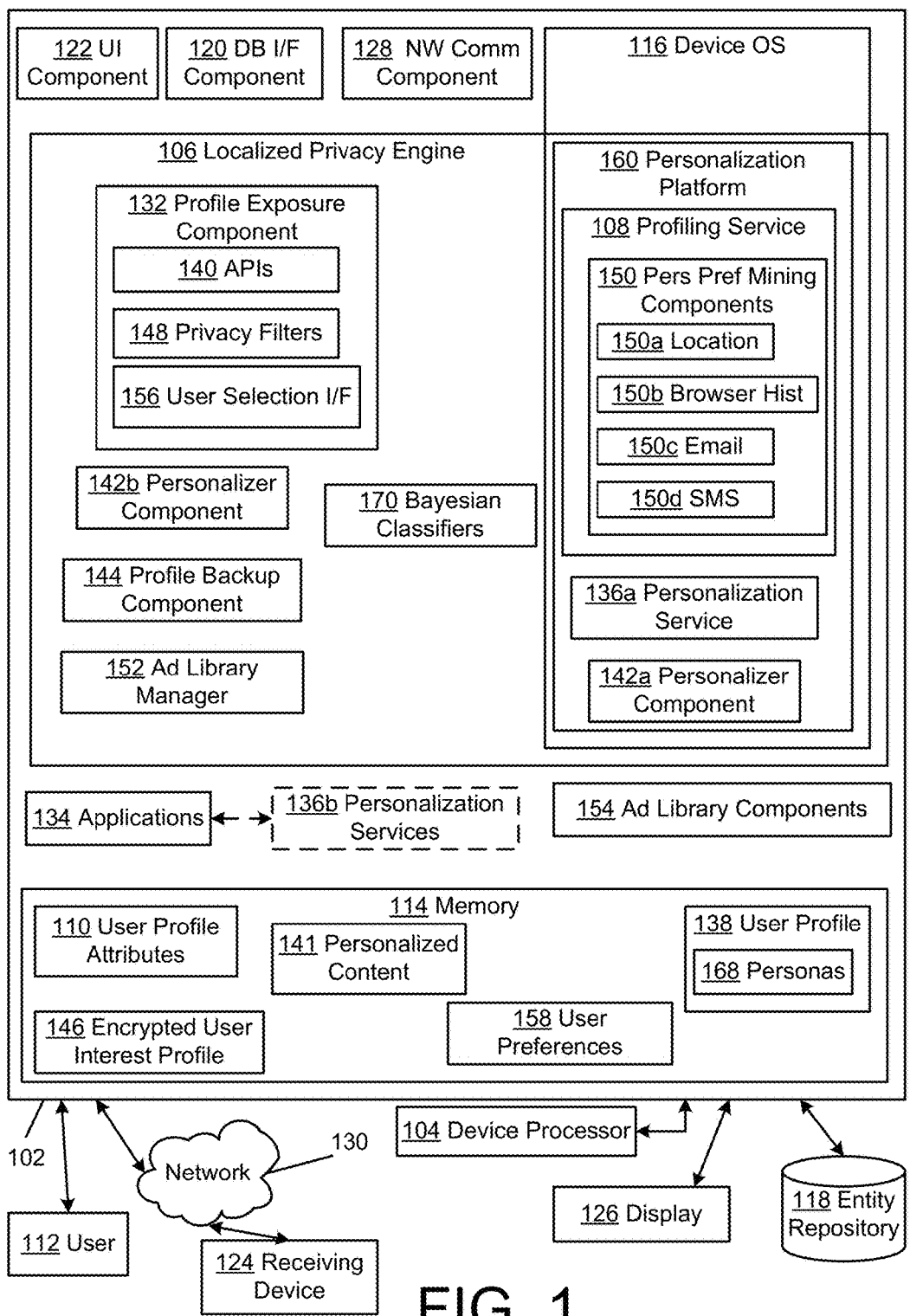
FIG. 1 is a block diagram of an example system for combining personalization and privacy locally on devices.

FIGS. 7*a*-7*d* are a flowchart illustrating example operations of the system of FIG. 1.

Figure 8A:
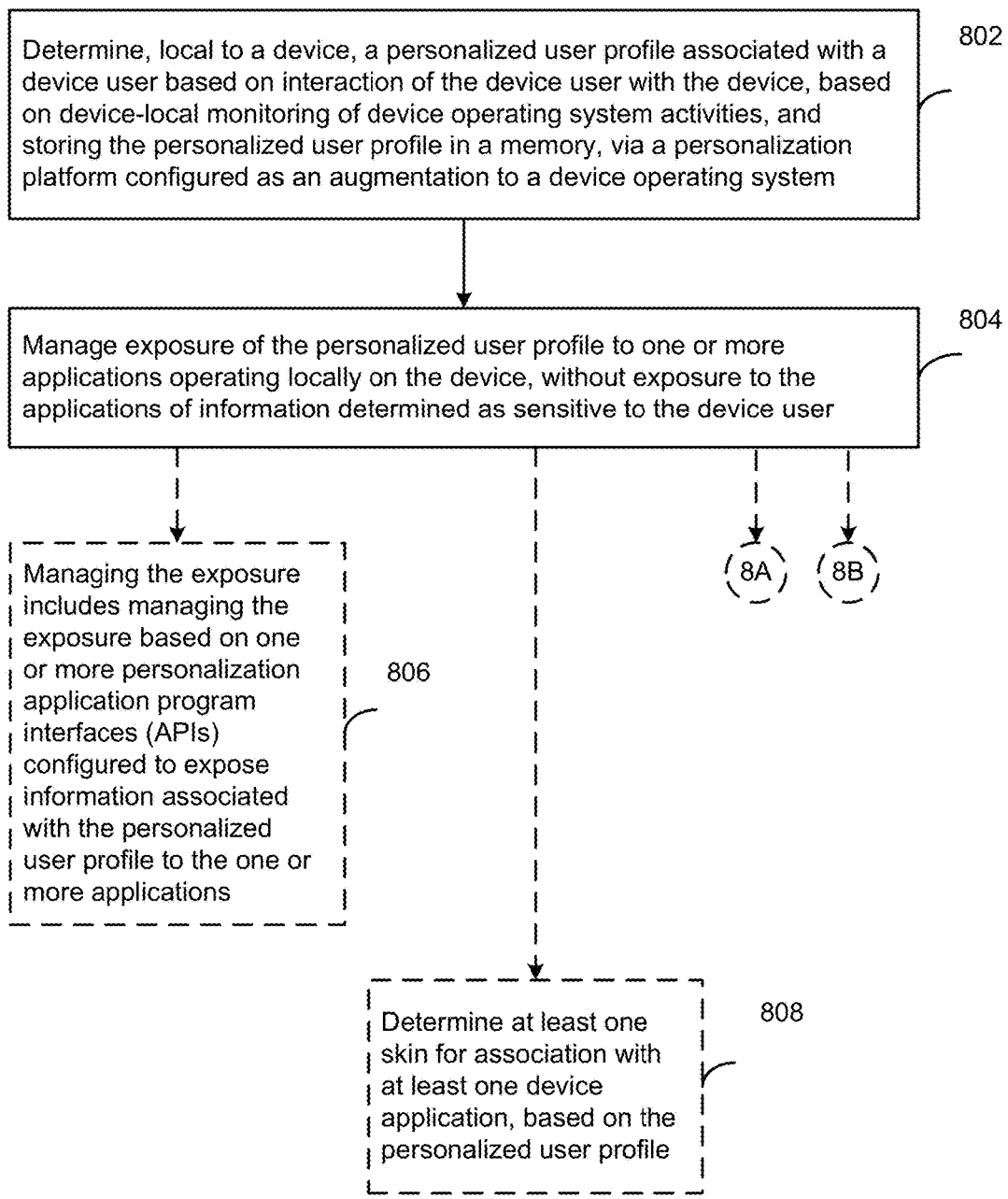
Figure 8B:
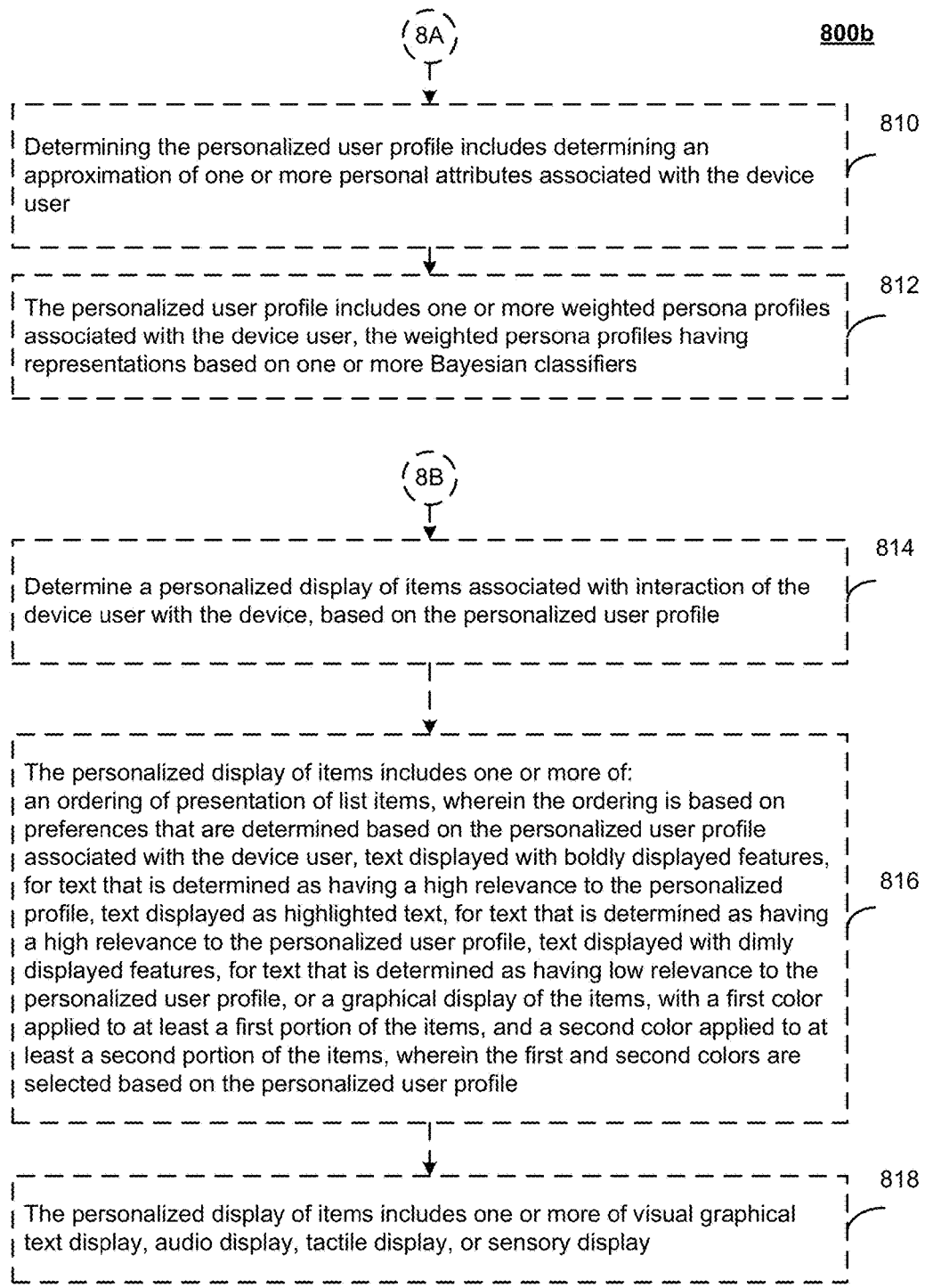

FIGS. 8*a*-8*b* are a flowchart illustrating example operations of the system of FIG. 1.

Figure 9:
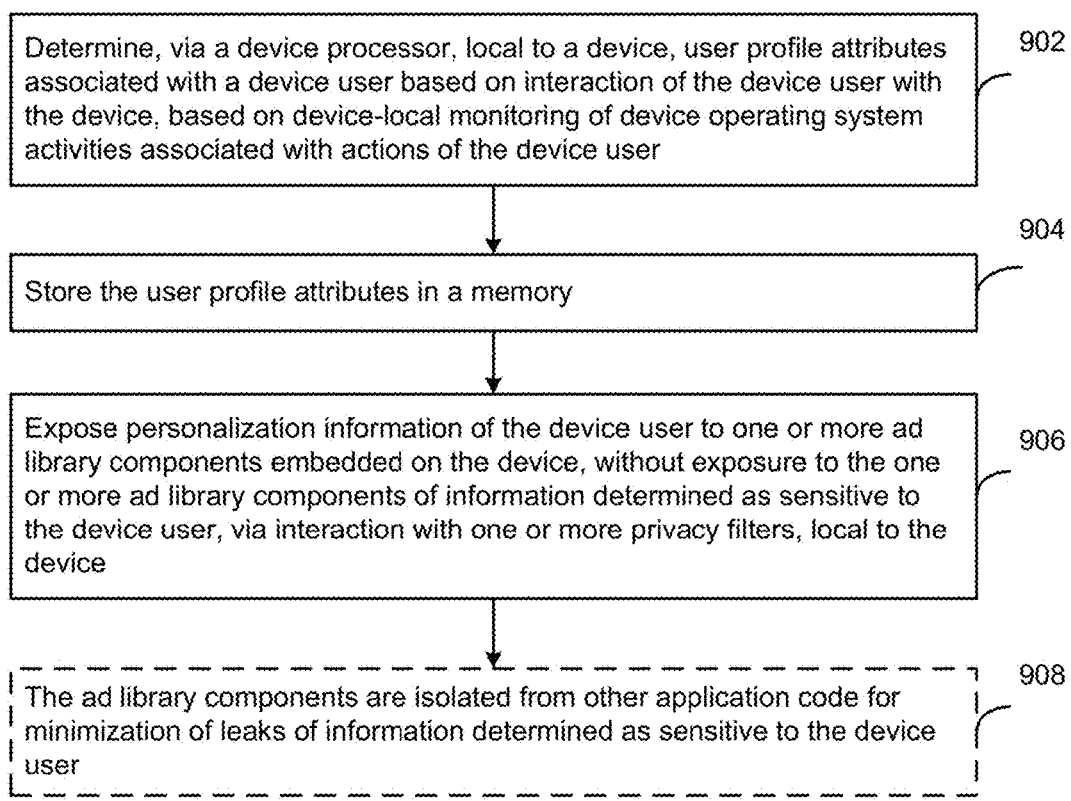

FIG. 9 is a flowchart illustrating example operations of the system of FIG. 1.

DETAILED DESCRIPTION

I. Introduction

Data aggregators may conveniently utilize obtained personalization information from users for such activities as targeting services and advertisements (ads). For example, restaurant and music recommendation services may improve with user interaction and training, and mobile butlers such as APPLE's SIRI and GOOGLE's ALFRED may adapt themselves to the user over time.

However, users may not desire some adverse effects of having their personal information made available to third parties. For example, there has recently been discussion in the mobile device user community with regard to a severity of data leak issues for location information and other data in mobile applications (apps).

Recently, a prevalence of smart phones and other mobile computing devices has opened up new avenues for personalized applications. Because users carry these devices with them wherever they go, they are subject to a substantial level of user interaction on a personal computing platform. Furthermore, these devices may be equipped with cameras, microphones, Global Positioning System (GPS) functionality, and several forms of wireless networking, providing a substantially constant stream of data from both the physical world and the Internet. Current examples of personalization may include SIRI, a mobile voice assistant, and personalized local search. Both types of technology may involve moving a substantial amount of user data into the cloud for processing.

For example, SIRI may attempt to parse human language in order to perform high-level tasks on behalf of the user, such as making dinner reservations, selecting movies, and making wine recommendations. Over time, SIRI may learn the device user's preferences, and may personalize its interface and recommendations accordingly, although the mechanism by which this is accomplished, is proprietary. If the user tends to invoke SIRI frequently, then this information will pertain to a sizeable portion of the user's day-to-day activities, providing SIRI a valuable window into the user's life when targeting content and advertisements. SIRI, however, transmits user's utterances to APPLE facilities, and potentially to third parties affiliated with APPLE, for analysis. As such, both the information provided directly by the user such as "set a birthday reminder" and secondary information such as gender and age may potentially be obtained through voice analysis.

For example, GETGLUE is a mobile application based on personalization (GETGLUE.COM). As users consume media and purchase goods, GETGLUE allows them to "check in" to these entities. They can then post reviews, ratings, and recommendations, which are tied to their personal profile. GETGLUE may use this information to recommend products and content to the user in future interactions, based on the activity of the pool of users in the GETGLUE community. For example, GETGLUE may partner with a collection of online merchants and services, who may benefit from the data provided by the user base to better target content toward users.

Other mobile applications, such as SHOPKICK (SHOPKICK.COM), may integrate location-awareness with user preference data. For example, when a SHOPKICK user enters a brick-and-mortar store, the application takes note of the activity, and consults the user's preferences to offer discounts and recommendations. For example, users may scan the barcodes of items in which they are interested as they shop, and SHOPKICK may incentivize this type of data acquisition with payments in a proprietary currency that may be used toward further discounts in the store. This use of personalization may thus offer traditional merchants the ability to target content, advertisements, and discounts towards users in a similar way as online retailers.

For example, AOL EDITIONS (EDITIONS.COM) is a mobile news magazine for tablets that learns over time, based on both explicitly stated user preferences and the magazine observing the user clicking on articles. EDITIONS may use a curated taxonomy of news topics, with users being actively encouraged to update their interests, creating increasingly relevant news content. EDITIONS may combine a user's calendar within its user interface (UI), further enhancing the personalized appearance.

As another example, SHOPITIZE (SHOPITIZE.COM) is a mobile offer application that provides users with personalized offers based on their shopping receipts, which the users scan into the application. The application provides the user with a spending report by parsing scanned receipts. In exchange for this service, users provide information that may be used to target them with future offers and services.

Such applications may acquire personalization signals from user interactions, may utilize secondary sources (e.g., FACEBOOK scraping) at least to obtain data initially, and refine personalization signals as a result of subsequent interactions. There may exist differences between personalization in the mobile space as opposed to desktop computing, as data on mobile devices may be more sensitive (or "toxic") than on desktop computers, potentially frequently including personal text messages, phone call records, etc. Further, processing power on mobile devices may be less than on desktop computers, while energy efficiency may be more desirable.

Example techniques discussed herein may provide for maintaining user data on a user device (e.g., a mobile device), under the control of the user. For example, the user may thus retain control over data in this model and cloud providers may no longer be involved with investing resources in properly maintaining data, preventing unauthorized data access, complying with local and international laws, running and powering expensive data centers, dealing with public relations repercussions of data leaks and unauthorized tracking, etc.

Example techniques discussed herein may provide operating system support for personalization, for example, via an operating system service implemented on top of a MICROSOFT WINDOWS PHONE operating system (OS). Thus, personalization support may be provided by the OS instead of applications. Example techniques discussed herein may provide approximations of a user's interests using personas (e.g., technophile, business executive), to conveniently enable application personalization or skinning.

For example, always-on user interest mining may effectively and accurately infer user interests in a mobile operating system by parsing and classifying multiple streams of information (e.g., information that is sensitive to the user) about the user within the OS, such as their electronic mail (email), Short Message Service (SMS), social network stream (e.g., a FACEBOOK stream), and network communications. For privacy protection, this sensitive information may be distilled to a coarse-grained profile (e.g., a coarse-grained persona), without being exposed to apps, which may aid in limiting the potential for information leaks.

For example, techniques discussed herein may enable simple, but effective OS-wide universal personalization. For example, long drop-down lists in application user interfaces (UIs) may be automatically sorted to better fit the order of a user's likely preferences. Example techniques discussed herein may provide exposure of a personalization application program interface (API) to applications, conveniently enabling more complex personalization and application skinning tasks.

Further, example techniques discussed herein may augment OS support for ad libraries, providing a more privacy-aware design for mobile advertising, combined with insight into user's preferences and tastes gained with example personalization techniques. Such an example approach may thus combine the capabilities of ad libraries with privacy concerns of an application, while reducing application permissions and enabling more powerful monetization models.

For example, techniques discussed herein may obtain user preferences and other attributes, and determine a user profile representation (e.g., personas), based on the determined information. Further, the user profile representation information may be exposed to applications, while maintaining the underlying user data that is used for determining the user profile representation, private to the OS.

Further, example techniques discussed herein may provide for separation of ads (e.g., ad libraries) and applications, and may also provide for monetizing them differently.

Example techniques discussed herein may provide an operating system service that allows for rich personalization by performing substantially accurate local data collection on a device (e.g., a handset) without exfiltrating user data from the device. Moreover, when user preference information is collected from applications and operating system (OS) interactions, the data may be substantially more accurate compared to information that an application (including a mobile browser) may obtain. For example, it may be beneficial to users and application developers to draw this information from a single unified and trustworthy source provided by the OS (e.g., the mobile OS). For example, personalization functionality may be built into a mobile OS and exposed to app developers via an easy-to-use application program interface (API).

Example techniques discussed herein may enable easy application personalization or skinning, based on approximating a user's interests using personas (e.g., technophile, business executive). The use of personas may aid in limiting the potential for user tracking Thus, while persona information may be shared by applications to perform server-based personalization, for example, it is not enough to link the user across multiple interactions.

II. Example Operating Environment

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

As further discussed herein, FIG. 1 is a block diagram of a system 100 for combining personalization and privacy locally on devices. As shown in FIG. 1, a system 100 may include a device 102 that includes at least one processor 104. The device 102 includes a localized privacy engine 106 that may include a profiling service 108 that may be configured to determine, local to the device 102, user profile attributes 110 associated with a device user 112 based on interaction of the device user 112 with the device 102, based on device-local monitoring of device user interactions with the device 102, and to store the user profile attributes 110 in a memory 114. The profiling service 108 may be configured as an augmentation to a device operating system 116 of the device 102, as discussed further herein.

For example, the localized privacy engine 106, or one or more portions thereof, may include executable instructions that may be stored on a tangible computer-readable storage medium, as discussed below. For example, the computer-readable storage medium may include any number of storage devices, and any number of storage media types, including distributed devices.

For example, an entity repository 118 may include one or more databases, and may be accessed via a database interface component 120. One skilled in the art of data processing will appreciate that there are many techniques for storing repository information discussed herein, such as various types of database configurations (e.g., relational databases, hierarchical databases, distributed databases) and non-database configurations.

According to an example embodiment, the device 102 may include the memory 114 that may store the user profile attributes 110. In this context, a "memory" may include a single memory device or multiple memory devices configured to store data and/or instructions. Further, the memory 114 may span multiple distributed storage devices.

According to an example embodiment, a user interface component 122 may manage communications between the device user 112 and the localized privacy engine 106. The device 102 may be associated with a receiving device 124 and a display 126, and other input/output devices. For example, the display 126 may be configured to communicate with the device 102, via internal device bus communications, or via at least one network connection.

According to example embodiments, the display 126 may be implemented as a flat screen display, a print form of display, a two-dimensional display, a three-dimensional display, a static display, a moving display, sensory displays such as tactile output, audio output, and any other form of output for communicating with a user (e.g., the device user 112).

According to an example embodiment, the system 100 may include a network communication component 128 that may manage network communication between the localized privacy engine 106 and other entities that may communicate with the localized privacy engine 106 via at least one network 130. For example, the network 130 may include at least one of the Internet, at least one wireless network, or at least one wired network. For example, the network 130 may include a cellular network, a radio network, or any type of network that may support transmission of data for the localized privacy engine 106. For example, the network communication component 128 may manage network communications between the localized privacy engine 106 and the receiving device 124. For example, the network communication component 128 may manage network communication between the user interface component 122 and the receiving device 124.

In this context, a "processor" may include a single processor or multiple processors configured to process instructions associated with a processing system. A processor may thus include one or more processors processing instructions in parallel and/or in a distributed manner. Although the processor 104 is depicted as external to the localized privacy engine 106 in FIG. 1, one skilled in the art of data processing will appreciate that the processor 104 may be implemented as a single component, and/or as distributed units which may be located internally or externally to the localized privacy engine 106, and/or any of its elements.

For example, the system 100 may include one or more processors 104. For example, the system 100 may include at least one tangible computer-readable storage medium storing instructions executable by the one or more processors 104, the executable instructions configured to cause at least one data processing apparatus to perform operations associated with various example components included in the system 100, as discussed herein. For example, the one or more processors 104 may be included in the at least one data processing apparatus. One skilled in the art of data processing will understand that there are many configurations of processors and data processing apparatuses that may be configured in accordance with the discussion herein, without departing from the spirit of such discussion. For example, the data processing apparatus may include a mobile device.

In this context, a "component" may refer to instructions or hardware that may be configured to perform certain operations. Such instructions may be included within component groups of instructions, or may be distributed over more than one group. For example, some instructions associated with operations of a first component may be included in a group of instructions associated with operations of a second component (or more components).

The localized privacy engine 106 may include a profile exposure component 132 configured to manage exposure of information associated with the user profile attributes to one or more applications 134 operating locally on the device 102, without exposure to the applications 134 or to third parties of information determined as sensitive to the device user 112.

For example, the device 102 may include a mobile device, and the device operating system 116 may include a mobile device operating system.

The localized privacy engine 106 may include a personalization service 136 configured to determine, local to the device, a personalized user profile 138 associated with the device user 112 based on the user profile attributes 110. For example, the personalization service 136 may be configured as an augmentation to the device operating system 116. For example, the personalization service 136 may be configured as a service implemented within one or more individual applications 134 embedded on the device 102.

For example, the personalized user profile 138 may include one or more personas, which may represent custom representations of various walks of life, offering different targets for personalization. For example, personas may provide a substantial degree of pseudonymity for users. In other words, use of a persona may provides techniques for declassifying sensitive information, as persona data may be released by the user to applications, as opposed to personally-identifiable information such as the user's name or other identifiers such as the device International Mobile Equipment Identity (IMEI).

For example, personas may include one or more of a soccer mom persona entity, a technophile persona entity, a political persona entity, a bachelor persona entity, a "tween" persona entity, a professional persona entity, an executive persona entity, a device user-specified persona entity, a retiree persona entity, or a "sports fan" entity. One skilled in the art of data processing will understand that there are many different possibilities for various personas, without departing from the spirit of the discussion herein.

For example, each persona may be represented by a Bayesian classifier $C_p$, which may be trained on a (manually) curated list of keywords characteristic to a profile p. For example, an "executive" persona may represent a strong interest in business, finance, and national news. Thus, a corresponding classifier may be populated with text from such Internet sites as the FINANCIAL TIMES. As another example, the technophile profile may represent a strong interest in technology, so the corresponding classifier may be populated with text from tech blogs.

For example, there may be intersections between these personas, as they may not be exclusive of each other. For example, the system may be modular modular with respect to the profiles that are used, and the system may easily be modified by training a Bayesian classifier on a new list of keywords.

For example, it is possible that many users will not have interests that match exactly one persona. As such, each persona may be assigned a persona weight that indicates how closely that persona matches the user. For example, if a user is very interested in technology news and somewhat interested in financial news, he/she may be associated with a high persona weight for the technophile persona and a moderate persona weight for the executive persona.

The profile exposure component 132 may include one or more personalization application program interfaces (APIs) 140 configured to expose information associated with the obtained user profile attributes 110 to one or more applications 134 configured to run on the device 102.

For example, the APIs 140 may represent a single OS-level data source for personalization (e.g., instead of application-specific, ad-hoc information sources) that may provide seamless and uniform functionality for a single user across many applications, devices, and platforms. For example, developers may use the APIs 140 for personalization and skinning.

For example, a "cold start problem" that may exist in many personalization tasks may be addressed, because of an OS-wide user personalization context, which is easily accessible to applications. Thus, applications may access an existing source of data about the user. Further, OS-wide data collection for a single repository may advantageously provide more complete and more accurate profile information about the user than a single application may be able to collect.

In this context, "skinning" may refer to refers to techniques for changing the look and feel of an application dynamically at runtime. For example, a "skin" may include a custom graphical appearance achieved by the use of a graphical user interface (GUI) that can be applied to specific software and Web sites to suit the purpose, topic, or tastes of different users. For example, a skin may be associated with themes. Applying a skin may modify a piece of software's look and feel. For example, the program appearance may be made more aesthetically pleasing, or the skinning may rearrange elements of the interface, potentially making the program easier to use.

The system 100 may expose APIs to third party developers that provide application-specific personalization. For example, four API functions are shown below:

(1) IsPersonalizationEnabled( ) returns true if personalization is enabled. For example users may toggle personalization on and off as part of the configuration UI.
(2) Classify (String s, Object o) classifies the relevance of o to persona s. For example, Classify ("technophile", "Computer") will return a high value, because computers are of high interest to technophiles. This call does not reveal any information about the user to the app, it is a convenience method to allow apps to classify objects.
(3) TopProfile( ) returns the most relevant profile to the user if personalization is enabled, and null otherwise.
(4) Ignore(Object o) informs the system not to apply OS-level personalization to o. This allows developers to bypass the GUI features such as automatic list reordering.

These example APIs may be accessed via a user-mode library that may be bundled with an application. Consequently, a single application may be written to the APIs that, for example, may operate on a standard image of the WINDOWS PHONE without the enhancements (albeit without personalization)

Algorithm 1 below illustrates an example of application skinning using profile information that is obtained through a system call on lines 2 and 5. Depending on the current persona, a different background may be used for the application.

Algorithm 1
Application Skinning

```
1 var bitmap;
2 if ("Technophile".Equals(TopProfile ( )))
3    bitmap = technophileImage ;
4 if ("Soccer Mom".Equals(TopProfile ( )))
5    bitmap = soccerImage;
6 ...
7 var personaBG = new ImageBrush(ImageSource=bitmap );
8 app.RootFrame.Background = personalizedBG ;
```

As shown in Algorithm 1, if the top profile matches one of the defined persona types, then "bitmap" is set to a corresponding persona image (lines 2-5, . . . ), which may be displayed for the user.

At least one of the one or more applications 134 operating locally on the device 102 may be configured for modification to interact with at least one of the APIs 140 to provide content 141 personalized to the device user 112.

One or more personalizer components 142a, 142b may be configured to determine personalized content 141 for the device user 112 based on the obtained user profile attributes 110. The personalizer components 142a, 142b may include one or more of a device operating system personalizer component 142a that includes a privileged service to perform automatic personalization within the device operating system 116, or an application personalizer component 142b that may be configured to interact with an application 134 that is operating locally on the device 102, and that is configured to obtain limited access to information associated with the obtained user profile 138 via one or more application program interfaces (APIs) 140 configured to expose the information, and to perform custom personalization.

According to an example embodiment, automatic universal personalization may be implemented within the device OS. For example, it is possible to modify a WINDOWS PHONE C# framework upon which apps are built. For example, it is possible to focus on reordering lists such that elements that are of the most interest to the user are at displayed at the top, while items of less interest to the user are kept at the bottom. For example, it is possible to modify internal widget classes such as SYSTEM.WINDOWS.CONTROLS.LISTBOX, which may be (directly or through the use of a subclass) used in many third party apps to display lists.

For example, a standard LISTBOX may keep an internal reference to an ITEMSOURCE, the list of elements to be displayed on the screen. An example modification may add a second, personalized list to the LISTBOX that includes all elements of the default list, but ranked by their relevance to the user profile. When the element is drawn to the display, the elements may be drawn with respect to this second ordering, rather than the default ordering.

Developers may wish to use care in universal personalization, to not personalize "too much." For example, if automatic personalization were to be applied to an alphabetized list, the alphabetic ordering may be lost. In light of this consideration, it may be possible to detect whether a list has been sorted, and if so, to not use the personalized list ordering to draw elements, instead relying on the ordering of an internal ITEMSOURCE list. For example, changes may be made to internal C# classes to inform a universal personalization mechanism that a list has been sorted, such as modifying a LIST.SORT( ) method to set a sorted flag on the list. Before performing the personalized sorting, classes such as LISTBOX may first check to determine whether the sorted flag has been set.

Positioning profiling and personalization within the device operating system may provide an opportunity to collect a significant amount of data to build a user interest profile. However, it also may provide an opportunity to perform personalization on user-level applications without any modification of the applications themselves.

For example, to achieve automatic personalization, the WINDOWS PHONE C# framework may be altered to reorder lists in the application UI, based on the persona weights. For legacy applications such as news readers, this has the effect of not only reordering the order in which stories are displayed (e.g., stories more relevant to the user's interests are shuffled to the top), but also reordering entire categories of subjects such that the "technology news" category page of a news reader app appears earlier in the menu than the "arts section" for a technophile.

Additionally, in order to provide users power over how the service is used, the users may toggle two independent facilities:

(1) Users may switch personalization on and off. For example, when personalization is off, the user may have a regular WINDOWS PHONE experience. When personalization is on, OS-level personalization may be enabled and apps have access to the user's persona.
(2) Users may switch data collection on and off, thus allowing them to freeze their profile scores. This allows users to indicate that the system should not track any behavior of the user until persona refinement is re-enabled. For example, this is a form of a privacy mode, similar to those supported in modern browsers.

A profile backup component 144 may be configured to obtain an encrypted user interest profile 146 based on the obtained user profile attributes 110 and to initiate transmission of the encrypted user interest profile 146 for storage on one or more other devices that are external to the device 102.

According to an example embodiment, a storage strategy may involve keeping the interest profiles local, on the current device. However, it is also possible to synchronize them, in an encrypted form, with an external device (e.g., with the cloud). For example, APPLE's iCLOUD may synchronize application settings, etc. However, unlike application settings, persona information may encroach on user privacy substantially less.

In addition to synchronization across multiple devices, some desktop, some mobile, some tablets, cloud synchronization may also serve as a backup. Similar types of synchronization may be used in several domains, including bookmark synchronization, MICROSOFT OFFICE setting synchronization, DROPBOX, automatic note synchronization with WINDOWS MOBILE PHONES and WINDOWS LIVE, etc.

At least one of the applications 134 operating locally on the device 102 may be configured to interact with one or more privacy filters 148 configured to prevent private information exposure.

The profiling service 108 may be configured to parse and classify a plurality of streams of data that include information related to the device user 112, within the device operating system 116 of the device 102.

For example, the profiling service 108 may include a plurality of personal preference mining components 150 configured to parse and classify the plurality of streams of data, the personal preference mining components 150 including one or more of a location mining component 150a, a browser history mining component 150b, an electronic mail (email) mining component 150c, or a Short Message Service (SMS) mining component 150d.

For example, it may be possible to instrument WINDOWS PHONE 7.5 (MANGO) to capture several personalization signals, sources of data that may indicate likely user preferences. These signals may then be used to locally classify the user with respect to the personas. For example, facilities for personalizers may include a privileged service to perform automatic personalization within the OS, and a set of APIs that provide third-party applications limited access to the user interest profile.

For example, it is possible that several popular networking features may be integrated directly into a device operating system and organized into a structure such as PEOPLE HUB. For example, an intention of the PEOPLE HUB is to organize social updates in a single, unified feed called the social feed, which may be updated automatically. The social feed is a beneficial target for mining because it is a source of structured user data. For example, a miner for FACEBOOK may be implemented by reading social feed data from the FACEBOOK service, including "likes," posts that the user made, and posts that others made to the user's wall.

It is possible that there is no direct analogue to the PEOPLE HUB on the ANDROID platform. However, since the account credentials may be stored in the ANDROID.ACCOUNTS.ACCOUNTMANAGER, an ANDROID device may make separate queries through the APIs exposed by high-value services such as FACEBOOK and TWITTER, and classify the results of those queries. However, this approach loses advantages of local processing that does not consume additional network bandwidth.

Due to the simplicity and inherent lack of structure in SMS messages, it may be possible to implement an SMS miner by interposing on the SMS handler in native code underlying the application framework. Alternatively, similar modifications may be made from within C# core libraries to read SMS messages. An example technique to implement a similar miner in ANDROID may involve periodically querying the CONTENTRESOLVER for SMS content, and classifying each SMS message in turn.

For example, Sending email may be exposed to third party users via MICROSOFT.PHONE.TASKS classes such as EMAILCOMPOSETASK. However, in order to capture simplify capture of both outgoing and incoming email, it may be possible to instead interpose on the internal implementation of Simple Mail Transfer Protocol (SMTP). Although fields such as the subject are not treated differently from text in the body, interposing on SMTP may avoid classifying noise, such as attached images.

Unlike SMS, Hypertext Transfer Protocol (HTTP) has significant structure. As an example, the WINDOWS PHONE may pass information to an HTTP handler that parses the structure of the message. By interposing on the parser as it parses text, relevant web text may be obtained without adding significant noise from non-textual HTTP traffic.

These signals demonstrate an advantage of performing signal capture at the Operating System level: since the OS and framework have a high level of privilege, the user may already trust these components to handle personal data. As such, the signal capture mechanisms are already within the user's trusted computing base.

Furthermore, instrumentation at the OS level has an advantage of being able to integrate multiple data sources together. For example, even rich data sources may suffer from a cold-start problem, but may be useful in aggregate.

For example, combining signals from multiple data sources together may boost a correct relevance score even with an addition of signal data that may be highly irrelevant, such as data from EBAY.

According to an example embodiment, the user may be provided an option to switch data collection on and off. However, data collection may also be always on, refining each persona's relevance score as users interact with their mobile devices.

For example, the plurality of streams of data may include one or more of a user electronic mail (email) stream of data, a Short Message Service (SMS) stream of data, a social network stream of data, or a network communication stream of data.

An ad library manager 152 may be configured to interact with one or more privacy filters 148 included in the profile exposure component 132, local to the device 102, to expose personalized information of the device user 112 to one or more ad library components 154 embedded on the device 102, without exposure to the one or more ad library components 154 of information determined as sensitive to the device user 112.

Recently, mobile applications have embedded advertisements (ads) as a monetization strategy. For example, ad embedding may be implemented by including a library that co-exists with an application. The current library ecosystem is well-developed and crosses mobile platform boundaries, with most popular libraries such as ADMOB providing versions that the developer can link with for iOS, ANDROID, and WINDOWS PHONE. Other such libraries are provided by FLURRY, MOBCLIX, ADWHIRL, MOBFOX, and many other companies.

Several problems both with confidentiality and integrity existing with the current techniques have been identified, many stemming from library and app code not being properly isolated. For example, ad libraries may access globally-identifiable data such as the device ID (e.g., ANDROIDID on ANDROID or DEVICEUNIQUEID on WINDOWS PHONE), or IMEI that is phone-specific. This allows cross-application mobile user profiling, a problem similar to tracking users on multiple sites on the web through the use of third-party trackers, but one made easier by the fact that correlation is substantially trivial to establish.

As another example, an ad library may force an application to increase its privileges (on the ANDROID platform, permissions such as INTERNET, ACCESS FINE LOCATION, and READ PHONE STATE), leading users to decide not to install the application for fear of what it may do to their device or with their data.

Since the library is not isolated from the core app, it may snoop on the rest of the application, exfiltrating sensitive user data. For example, a key logger masquerading as an ad library may be developed.

The current state with mobile ad libraries is similar to that with third-party trackers that co-exist alongside first-party content on a web site. For example, disadvantages of unrestricted sharing of code and data between application logic and ad libraries are similar. Both integrity violations such as the library interfering with normal app operation and privacy violations such as the ad library snooping on user data located within the app, are possible. Further, availability challenges emerge if the ad library is substantially using network resources, etc.

Example techniques discussed herein may provide mechanisms for isolating mobile ad libraries.

For example, a mobile OS may explicitly separate ad libraries from the rest of the app. The library may involve more permissions that the application utilizes, including location data and persona information. However, the library may be prevented from obtaining global unique identifiers such as DEVICEUNIQUEID and may include no persistent state. Thus, the OS may erase library-specific state, which may in turn lower app permissions and provide a degree of data isolation.

Thus, the ad separation approach may advantageously involve jailing the ad libraries in several different ways. For example, it may be possible to lower or deny permissions such as location permissions. However, in many cases affected libraries may fail or cease to be useful. However, it may be desirable to protect the user from aggressive tracking that some ad libraries perform. For example, it may be desirable to (1) make the library compartment stateless; (2) randomize user-specific identifiers; and (3) institute privacy-enhancing measures such as making location data more approximate.

Using such an example design approach to the mobile platform, both free and paid versions of the same app may be delivered as part of the same application package. Thus, application updates to the free and the paid "pro" version do not fall out of sync. Further, the app marketplace, with the developer's permission, may control the pricing model by observing the demand and competition, or using an auction, instead of the developers attempting to do so, based on their intuition and incomplete information about the market.

Further, this approach provides a compromise between the application cost and the amount of advertising the user receives. For example, the user may be presented with three versions of the same application, as discussed further herein. However, using example techniques discussed herein, all three versions be generated from the same application package, and the pricing may be selected by the user at installation time.

For example, the profile exposure component 132 may include a user selection interface 156 configured to obtain one or more user preferences 158 indicating one or more device user permissions associated with information associated with the device user 112.

For example, access to persona data in applications may be guarded with a permission prompt, similar to that more commonly used for obtaining location data. Thus, the user may be informed of persona data access and is provided an opportunity to opt in. Additionally, at a level of application manifest, access to the persona data may involve statically declared permissions. For example, extra scrutiny, code review, and testing may be applied to applications that request persona data by application marketplace maintainers.

The device operating system 116 may be augmented with a personalization platform 160 configured to determine, local to the device 102, a personalized user profile 138 associated with the device user 112 based on interaction of the device user 112 with the device 102, based on device-local monitoring of device/user interactions, and to store the personalized user profile 138 in the memory 114.

For example, the personalized user profile 138 may include one or more weighted persona profiles 168 associated with the device user 112, the weighted persona profiles 168 having representations based on one or more Bayesian classifiers 170, as discussed further herein.

For example, the personalization data may be stored at the OS level. For example, a vector of persona weights may be maintained for each user at any given time. This vector may be maintained serialized as part of the OS service. For example, this maintenance may be provided as an incremental process, and such an implementation may record two values for each persona p: (1) a relevance value that may be determined as a sum of interest scores from classifier $C_p$, $s_p$, and (2) a support value that may be determined as a number of elements that have been scored by $C_p$, indicated as $n_p$.

Intuitively, $s_p$ may indicate a raw score of how closely the persona matches the user, while $n_p$ may indicate an amount of evidence to support that score. For example, the persona weight may be determined based on the fraction $s_p/n_p$. Thus, for example, two data vectors per persona may be stored. It is possible that these vectors are not directly shared with any user mode apps.

For example, each persona may be represented by a Naive Bayesian classifier. For example, classifiers may be trained offline on manually curated lists of words obtained for web pages relevant to each profile (e.g., TECHCRUNCH.COM for "technophile" and ESPN.COM for "sports fan" personas). For example, an alternative source of such pages may include taxonomies such as the Open Directory Project (ODP).

Such example training techniques may result in thousands of words per persona, which may be used to obtain the probabilities P ($w_i|C_j$) for each attribute word $w_i$ and each persona $C_j$. This classification data may then be loaded into an OS-level service.

While building each classifier may in principle be a time-consuming task, especially if a large volume of training data is used, applying classification to a piece of text may be fast. For example, for finding the most relevant profile for a piece of text, the text may be tokenized it into words, and a simple log-likelihood addition may be performed for each persona, maximizing over that value.

Figure 2:
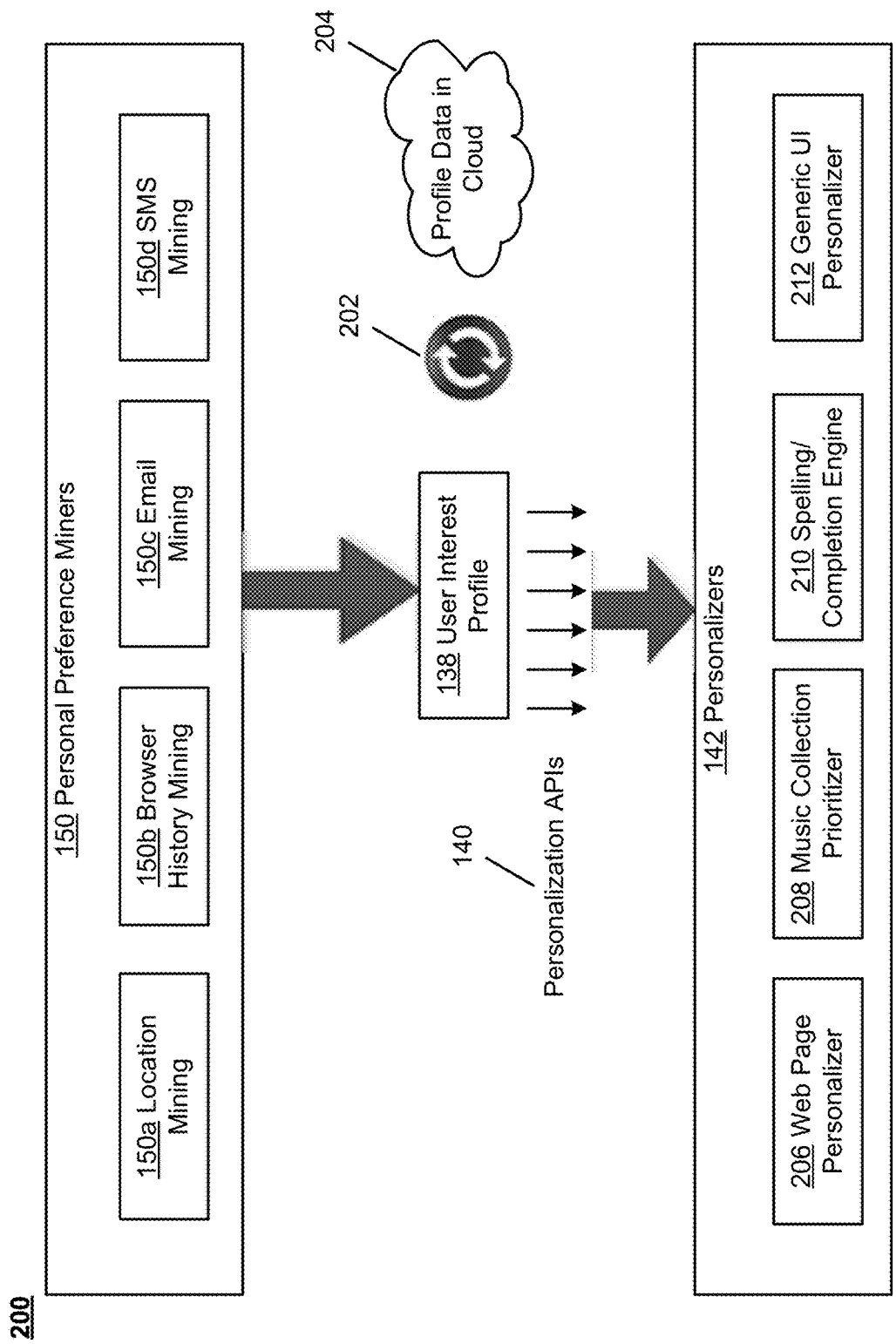
FIG. 2 is a block diagram of an example architecture for the system of FIG. 1.

FIG. 2 is a block diagram of an example architecture for the system of FIG. 1. As shown in FIG. 2, the personal preference mining components 150 may parse and classify streams of data, and may include one or more of a location mining component 150a, a browser history mining component 150b, an electronic mail (email) mining component 150c, or a Short Message Service (SMS) mining component 150d. As discussed further herein, both applications and the underlying device operating system may expose opportunities for personalization. For example, user interactions may be observed by personal preference miners (e.g., the preference mining components 150), shown at the top of FIG. 2, and may be compiled to the user interest profile 138, which may be used by a variety of personalizers 142 for various forms of personalization, as shown at the bottom of the FIG. 2. The personal preference miners 150 may be as diverse as location information miners 150a that may obtain information that may indicate whether the user 112 is around home or on a trip, or miners that may discover an activity of the user 112 (e.g., walking, riding a train, in a car, etc.). For example, the miners may analyze user's email, SMS, and social network (e.g., FACEBOOK) streams to establish the user's interests and preferences for news and entertainment.

As shown in FIG. 2, the personalized user profile 138 may be backed up to, and/or synchronized with (202), one or more devices external to the device 102 (e.g., one or more servers in the cloud) 204, as discussed further herein.

As shown in FIG. 2, the personalizers 142 may include one or more of a web page personalizer 206, a music collection prioritizer 208, a spelling/completion engine 210, and/or a generic user interface (UI) personalizer 212.

A design challenge on many mobile devices involves a lack of screen space. As such, long news articles may be difficult to read, prompting development of various bookmarking services such as INSTAPAPER, READITLATER, etc. However, in a news article such as might be found in WALL STREET JOURNAL or THE NEW YORK TIMES, often no more than a fraction of an article may be relevant to a particular user. As such, a customized summarization strategy may aid in making the user more productive.

FIGS. 3a-3c depict example user views of example personalized presentations of text. FIG. 3a depicts a device 302, with a screen display 304, displaying a text sample 306 (e.g., from the WALL STREET JOURNAL). FIG. 3b depicts a summarized version of the text with unnecessary details faded 308, and FIG. 3b depicts an excerpt with highlighted entities 310. While many users may prefer versions of FIG. 3b and FIG. 3c, (e.g., because both draw attention to more interesting portions of the text), a developer may consider the question of how to determine what may be interesting to a particular user, and what may be desirable to bring to his/her attention. For example, if the user is interested in business or public policy, the aspects of the text that relate to the Federal Trade Commission and its chairman are likely relevant. For a user interested in technology, portions of the text discussing MICROSOFT are likely relevant. Thus, personas such as a "business executive" or a "technophile" may be prototypical users with an easily recognizable set of interests that may offer targets for personalization.

In accordance with example techniques discussed herein, task training may be handled at the level of the device operating system, and may draw from other OS functionality as well as user-level applications. Thus way, the application developers may advantageously focus their energy on developing personalization, and the user is not tasked with training every application they use.

Example techniques for news personalization, app skinning, and other personalization types are discussed below. For example, a custom Rich Site Summary (RSS) reader may be implemented to pull stories from multiple (e.g., 10) RSS news feeds, to sample from these feeds to display a list of stories to the user 112. For example, the OS-level GUI enhancements discussed above may be disabled. For example, the custom RSS reader may instead rely on a built-in table in to rate how interesting each of the RSS feeds subscribed to by the custom RSS reader may be to a profile. FIG. 4 depicts an example table storing relevance values of news topics associated with personas. For example, as shown in FIG. 4, a "Tech" RSS feed may rate as 6 to a "bachelor" persona, as 5 to a business executive, and as 3 to a retiree. As another example, a "Politics" RSS feed may rate as 10 to an "activist" persona, as 4 to a bachelor, and as 1 to a "tween."

The custom RSS reader may operate with no personalization, in which case stories from each RSS feed may be sampled uniformly and displayed to the user in the order in which they are sampled. When personalization is enabled, the custom RSS reader may query the API to determine the top profile of the user, and then may sample according to a column (row) of the built-in table that corresponds to that persona.

FIGS. 5a-5c depict example user views of example personalized presentations of Rich Site Summary (RSS) feeds. For example, FIG. 5a illustrates an example device 502 displaying RSS feed text portions 504a, 504b, 504c, 504d, with no personalization applied. For example, a personalization switch 506 may be selected to indicate personalization off (508) or on. In FIG. 5b, the same set of stories is sampled according to the interests of a soccer mom persona column (row) of the built-in table, which places an emphasis on Health and Entertainment stories, resulting in a display of RSS feed text portions 510a, 510b, 510c, 510d, with personalization applied. Similarly, FIG. 5b shows the same set of stories sampled by the interests of a "technophile" column (row), resulting in a display of RSS feed text portions 512a, 512b, 512c, 512d, with personalization applied.

Thus, by exposing limited information to third party applications, developers have flexibility to reinterpret the top profile in any way that they desire. Applications such as the custom RSS reader may sample tech stories for the soccer mom, even though the built-in Bayesian classifier for that profile may not have tech keywords. Furthermore, the personalization may be accomplished in a privacy-preserving manner. For example, the custom RSS reader may use client-side personalization, so that the owner of the RSS feeds may not learn the top profile of the user from the requests that are made by the custom RSS reader.

Example techniques discussed herein may also simplify the development of personalized apps by exposing a classification service to developers, rather than forcing developers to include general-purpose classification algorithms in their applications. The example system allows developers to query how relevant an entity is to each persona, and use that relevance value to determine if the entity will be of interest to the user. The custom RSS reader may advantageously use this feature when users add a new RSS feeds to their RSS streams, as discussed further below.

Algorithm 2
Add RSS feed to RSS stream

```
1 var top = TopProfile ( );
2 var storyText = RSS_NewsItem.getText ( );
3 var weight = Classify(top , storyText );
4 if (weight > THRESHOLD ){
5   storiesToDisplay .append(RSS_NewsItem );
6 }
7 Ignore( storiesToDisplay );
```

As shown in Algorithm 2, the top profile for the user is obtained on line 1 and then it is determined how relevant a given story is to the top profile on line 3. If the story is considered to be highly relevant, as defined by a threshold value on line 4, it is displayed. On line 7, a notification is provided that the list of high-interest stories may not be subject to universal personalization, since it is constructed with custom, fine-grained personalization.

OS-level personalization may have broad applicability. For example, a simple calculator may be implemented using the API discussed herein. FIGS. 6a-6b depict example user views of example personalized application interfaces. For example, FIG. 6a depicts a device 602 displaying a default calculator 604 with no personalization.

When personalization is enabled and the top profile is a "tween," the calculator may be re-skinned for a pre-teen girl (not shown). When the top profile is a retiree, the same calculator may revert to a high contrast, high usability mode 610 in which text size is increased, as shown in FIG. 6b.

Example techniques discussed herein may provide an alternative to providing complicated configuration menus to users who nonetheless prefer different configurations. Although the calculator may perform personalization at each run, an alternative may use user profile data to provide an initial configuration that is likely to be close to what the user wants, and allow him/her to adjust configuration options from that point.

As discussed below, personalization such as word completion, spelling checking, and voice recognition may advantageously be implemented on devices such as mobile devices, as mobile devices may have small form factors. Thus, it may be advantageous to streamline many tasks, such as typing, for the user. For example, if a user has typed "decla", an example completion may be "declaration" for a user interested in law, and "declamation" for a user interested in public speaking or opera.

Similarly, voice recognition software such as SIRI on iOS or DRAGON DICTATE may be pre-populated with a different set of prior probabilities. For example, a business executive may be more likely to talk about "cash management", whereas a technophile may be more likely to talk about "cache management".

As the discussion above suggests, different personas are likely to use a different vocabulary, or at least are likely to use the same word with different probabilities. As such, spell checking may order suggestions differently for different personas, and may be provided with custom persona-specific dictionaries, augmenting the main dictionary.

For example, a smart phone may be pre-loaded with browsers whose history and bookmarks are pre-populated with a short list of sites that the phone provider thinks may be relevant for the user, such as APPLE.COM for iOS. Based on the user's persona, the list of suggested sites for mobile browsing may be pre-populated differently. For a business executive, FT.COM, MARKETWATCH.COM, and FORBES.COM may be relevant, whereas for a technophile, SHASHDOT.ORG and TECHCRUNCH.COM may be of value.

Similar techniques may be applied to Uniform Resource Locator (URL) and search suggestions obtained by the mobile browser from the search engine (e.g., BING, GOOGLE, YAHOO). These suggestion lists may be re-prioritized based on the user persona.

III. Flowchart Description

Features discussed herein are provided as example embodiments that may be implemented in many different ways that may be understood by one of skill in the art of data processing, without departing from the spirit of the discussion herein. Such features are to be construed only as example embodiment features, and are not intended to be construed as limiting to only those detailed descriptions.

Figure 7A:
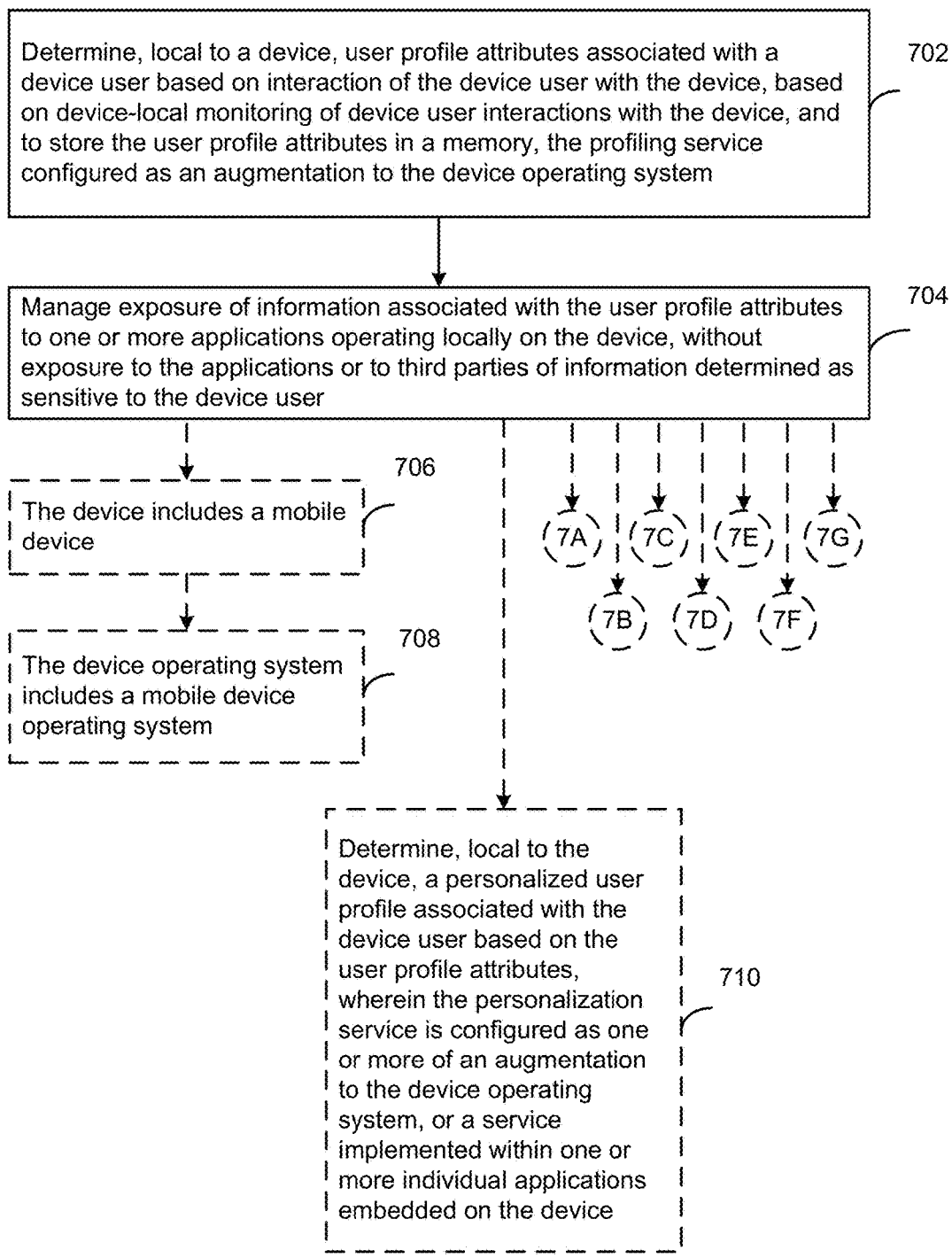

FIG. 7 is a flowchart illustrating example operations of the system of FIG. 1, according to example embodiments. In the example of FIG. 7a, user profile attributes associated with a device user may be determined, based on interaction of the device user with the device, based on device-local monitoring of device user interactions with the device, via a profiling service configured as an augmentation to a device operating system of the device. The user profile attributes may be stored in a memory (702). For example, the profiling service 108 that may determine, local to the device 102, user profile attributes 110 associated with the device user 112 based on interaction of the device user 112 with the device 102, based on device-local monitoring of device user interactions with the device 102, and to store the user profile attributes 110 in a memory 114 as discussed above.

Exposure of information associated with the user profile attributes to one or more applications operating locally on the device may be managed, without exposure to the applications or to third parties of information determined as sensitive to the device user (704). For example, the profile exposure component 132 may manage exposure of information associated with the user profile attributes to one or more applications 134 operating locally on the device 102, without exposure to the applications 134 or to third parties of information determined as sensitive to the device user 112 as discussed above.

For example, the device may include a mobile device (706), and the device operating system includes a mobile device operating system (708).

According to an example embodiment, a personalized user profile associated with the device user may be determined, by a personalization service local to the device, based on the user profile attributes. The personalization service may be configured as one or more of an augmentation to the device operating system, or a service implemented within one or more individual applications embedded on the device (710). For example, the personalization service 136 may determine, local to the device, the personalized user profile 138 associated with the device user 112 based on the user profile attributes 110. For example, the personalization service 136 may be configured as an augmentation to the device operating system 116. For example, the personalization service 136 may be configured as a service implemented within one or more individual applications 134 embedded on the device 102, as discussed above.

Figure 7B:
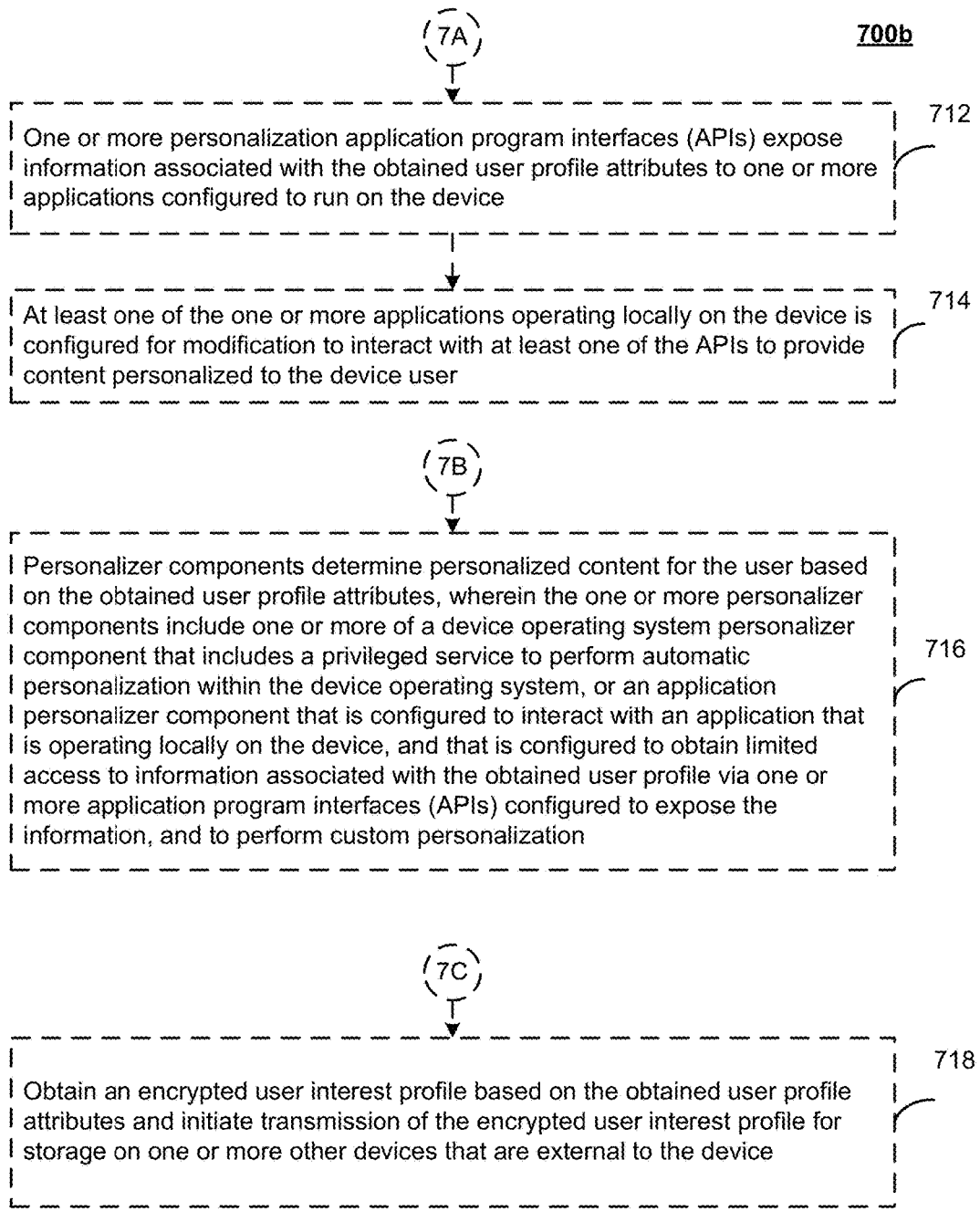

One or more personalization application program interfaces (APIs) may expose information associated with the obtained user profile attributes to one or more applications configured to run on the device (712), in the example of FIG. 7b. For example, the profile exposure component 132 may include one or more personalization application program interfaces (APIs) 140 configured to expose information associated with the obtained user profile attributes 110 to one or more applications 134 configured to run on the device 102, as discussed above.

At least one of the one or more applications operating locally on the device may be configured for modification to interact with at least one of the APIs to provide content personalized to the device user (714). For example, the applications 134 operating locally on the device 102 may be configured for modification to interact with at least one of the APIs 140 to provide content 141 personalized to the device user 112, as discussed above.

One or more personalizer components may determine personalized content for the device user based on the obtained user profile attributes. For example, the personalizer components may include one or more of a device operating system personalizer component that includes a privileged service to perform automatic personalization within the device operating system, or an application personalizer component that is configured to interact with an application that is operating locally on the device, and that is configured to obtain limited access to information associated with the obtained user profile via one or more application program interfaces (APIs) configured to expose the information, and to perform custom personalization (716).

For example, the personalizer components 142a, 142b may be configured to determine personalized content 141 for the device user 112 based on the obtained user profile attributes 110. The personalizer components 142a, 142b may include one or more of a device operating system personalizer component 142a that includes a privileged service to perform automatic personalization within the device operating system 116, or an application personalizer component 142b that may be configured to interact with an application 134 that is operating locally on the device 102, and that is configured to obtain limited access to information associated with the obtained user profile 138 via one or more application program interfaces (APIs) 140 configured to expose the information, and to perform custom personalization, as discussed above.

According to an example embodiment, an encrypted user interest profile may be obtained based on the obtained user profile attributes and transmission of the encrypted user interest profile may be initiated, for storage on one or more other devices that are external to the device (718). For example, the profile backup component 144 may obtain the encrypted user interest profile 146 based on the obtained user profile attributes 110, and initiate transmission of the encrypted user interest profile 146 for storage on one or more other devices that are external to the device 102, as discussed above.

Figure 7C:
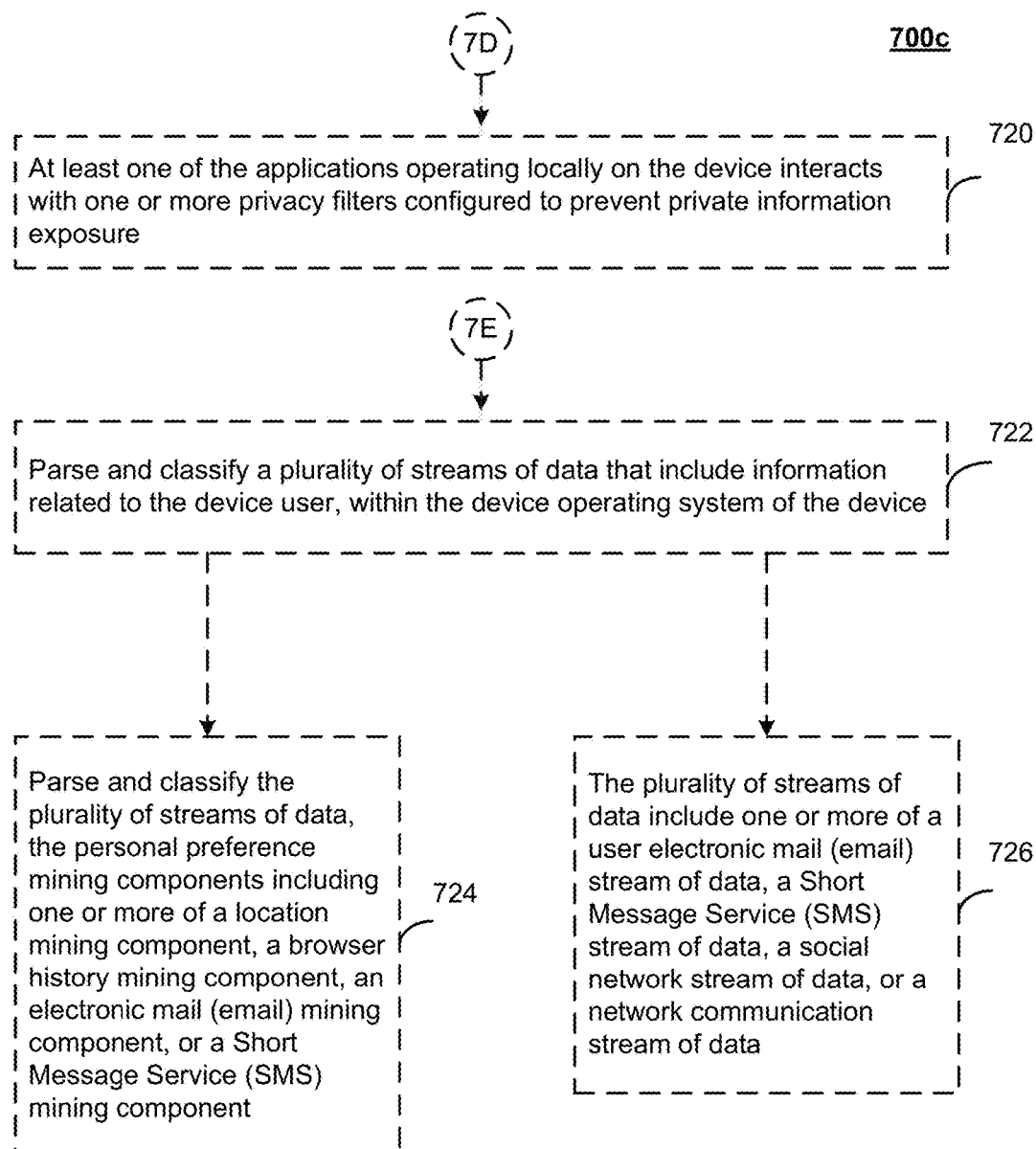

According to an example embodiment, at least one of the applications operating locally on the device may interact with one or more privacy filters configured to prevent private information exposure (720), in the example of FIG. 7c. For example, the applications 134 operating locally on the device 102 may interact with one or more privacy filters 148 configured to prevent private information exposure, as discussed above.

A plurality of streams of data that include information related to the device user may be parsed and classified, within the device operating system of the device (722). For example, the profiling service 108 may parse and classify a plurality of streams of data that include information related to the device user 112, within the device operating system 116 of the device 102, as discussed above.

For example, the streams of data may be parsed and classified, via personal preference mining components including one or more of a location mining component, a browser history mining component, an electronic mail (email) mining component, or a Short Message Service (SMS) mining component (724). For example, the profiling service 108 may include a plurality of personal preference mining components 150 configured to parse and classify the plurality of streams of data, the personal preference mining components 150 including one or more of a location mining component 150a, a browser history mining component 150b, an electronic mail (email) mining component 150c, or a Short Message Service (SMS) mining component 150d, as discussed above.

For example, the streams of data may include one or more of a user electronic mail (email) stream of data, a Short Message Service (SMS) stream of data, a social network stream of data, or a network communication stream of data (726).

An ad library manager may interact with one or more privacy filters included in the profile exposure component, local to the device, to expose personalized information of the device user to one or more ad library components embedded on the device, without exposure to the one or more ad library components of information determined as sensitive to the device user (728), in the example of FIG. 7c. For example, the ad library manager 152 may interact with the privacy filters 148 included in the profile exposure component 132, local to the device 102, to expose personalized information of the device user 112 to ad library components 154 embedded on the device 102, without exposure to the ad library components 154 of information determined as sensitive to the device user 112, as discussed above.

One or more user preferences indicating one or more device user permissions associated with information associated with the device user may be obtained (730). For example, the profile exposure component 132 may include a user selection interface 156 that may obtain the user preferences 158 indicating device user permissions associated with information associated with the device user 112, as discussed above.

For example, the device operating system may be augmented with a personalization platform configured to determine, local to the device, a personalized user profile associated with the device user based on interaction of the device user with the device, based on device-local monitoring of device/user interactions, and to store the personalized user profile in the memory (732). For example, the device operating system 116 may be augmented with a personalization platform 160 that may determine, local to the device 102, the personalized user profile 138 associated with the device user 112 based on interaction of the device user 112 with the device 102, based on device-local monitoring of device/user interactions, and may store the personalized user profile 138 in the memory 114, as discussed above.

FIG. 8 is a flowchart illustrating example operations of the system of FIG. 1, according to example embodiments. In the example of FIG. 8a, a personalized user profile associated with a device user that is based on interaction of the device user with a device may be determined, local to the device, based on device-local monitoring of device operating system activities, and the personalized user profile may be stored in a memory, via a personalization platform configured as an augmentation to a device operating system (806). For example, the personalization service 136 may determine, local to the device, the personalized user profile 138 associated with the device user 112 based on the user profile attributes 110, as discussed above.

Exposure of the personalized user profile to one or more applications operating locally on the device may be managed, without exposure to the applications of information determined as sensitive to the device user (804).

For example, managing the exposure may be based on one or more personalization application program interfaces (APIs) configured to expose information associated with the personalized user profile to the one or more applications (806). For example, the profile exposure component 132 may expose information associated with the obtained user profile attributes 110 to one or more applications 134 configured to run on the device 102, as discussed above.

For example, at least one skin may be determined for association with at least one device application, based on the personalized user profile (808).

For example, determining the personalized user profile may include determining an approximation of one or more personal attributes associated with the device user (810), in the example of FIG. 8b.

For example, the personalized user profile may include one or more weighted persona profiles associated with the device user, the weighted persona profiles having representations based on one or more Bayesian classifiers (812). For example, the personalized user profile 138 may include one or more weighted persona profiles 168 associated with the device user 112, the weighted persona profiles 168 having representations based on one or more Bayesian classifiers 170, as discussed above.

A personalized display of items associated with interaction of the device user with the device may be determined, based on the personalized user profile (814).

For example, the personalized display of items may include one or more of an ordering of presentation of list items, wherein the ordering is based on preferences that are determined based on the personalized user profile associated with the device user, text displayed with boldly displayed features, for text that is determined as having a high relevance to the personalized profile, text displayed as highlighted text, for text that is determined as having a high relevance to the personalized user profile, text displayed with dimly displayed features, for text that is determined as having low relevance to the personalized user profile, or a graphical display of the items, with a first color applied to at least a first portion of the items, and a second color applied to at least a second portion of the items, wherein the first and second colors are selected based on the personalized user profile (816).

For example, the personalized display of items may include one or more of visual graphical text display, audio display, tactile display, or sensory display (818).

FIG. 9 is a flowchart illustrating example operations of the system of FIG. 1, according to example embodiments. In the example of FIG. 9a, user profile attributes associated with a device user may be determined, via a device processor, local to a device, based on interaction of the device user with the device, based on device-local monitoring of device operating system activities associated with actions of the device user (902). For example, the profiling service 108 may determine, local to the device 102, user profile attributes 110 associated with the device user 112 based on interaction of the device user 112 with the device 102, based on device-local monitoring of device user interactions with the device 102, and to store the user profile attributes 110 in a memory 114, as discussed above.

The user profile attributes may be stored in a memory (904). For example, the profiling service 108 may determine, local to the device 102, user profile attributes 110 associated with the device user 112 based on interaction of the device user 112 with the device 102, based on device-local monitoring of device user interactions with the device 102, and may store the user profile attributes 110 in a memory 114, as discussed above.

Personalization information of the device user may be exposed to one or more ad library components embedded on the device, without exposure to the one or more ad library components of information determined as sensitive to the device user, via interaction with one or more privacy filters, local to the device (906). For example, the ad library manager 152 may interact with the privacy filters 148 included in the profile exposure component 132, local to the device 102, to expose personalized information of the device user 112 to the ad library components 154 embedded on the device 102, without exposure to the one or more ad library components 154 of information determined as sensitive to the device user 112, as discussed above.

For example, the ad library components may be isolated from other application code for minimization of leaks of information determined as sensitive to the device user (908). For example, an application loader may be configured to receive at least a portion of the ad library components included with an application component package, such that the application component package may include a first location indicator indicating a location of ad library code and a second location indicator indicating a location of application code, for indicating separate locations of the ad library code and the application code to the device operating system. Thus, the device operating system may be informed of the locations of code for the application, and locations of code for the as library components.

One skilled in the art of data processing will understand that there are many ways of providing personalization and privacy local to a device, without departing from the spirit of the discussion herein.

Customer privacy and confidentiality have been ongoing considerations in data processing environments for many years. Thus, example techniques discussed herein may use user input and/or data provided by users who have provided permission via one or more subscription agreements (e.g., "Terms of Service" (TOS) agreements) with associated applications or services associated with browsing. For example, users may provide consent to have their input/data transmitted and stored on devices, though it may be explicitly indicated (e.g., via a user accepted text agreement) that each party may control how transmission and/or storage occurs, and what level or duration of storage may be maintained, if any.

Implementations of the various techniques described herein may be implemented in digital electronic circuitry, or in computer hardware, firmware, software, or in combinations of them (e.g., an apparatus configured to execute instructions to perform various functionality).

Implementations may be implemented as a computer program embodied in a pure signal such as a pure propagated signal. Such implementations may be referred to herein as implemented via a "computer-readable transmission medium."

Alternatively, implementations may be implemented as a computer program embodied in a machine usable or machine readable storage device (e.g., a magnetic or digital medium such as a Universal Serial Bus (USB) storage device, a tape, hard disk drive, compact disk, digital video disk (DVD), etc.), for execution by, or to control the operation of, data processing apparatus, e.g., a programmable processor, a computer, or multiple computers. Such implementations may be referred to herein as implemented via a "computer-readable storage medium" or a "computer-readable storage device" and are thus different from implementations that are purely signals such as pure propagated signals.

A computer program, such as the computer program(s) described above, can be written in any form of programming language, including compiled, interpreted, or machine languages, and can be deployed in any form, including as a stand-alone program or as a module, component, subroutine, or other unit suitable for use in a computing environment. The computer program may be tangibly embodied as executable code (e.g., executable instructions) on a machine usable or machine readable storage device (e.g., a computer-readable storage medium). A computer program that might implement the techniques discussed above may be deployed to be executed on one computer or on multiple computers at one site or distributed across multiple sites and interconnected by a communication network.

Method steps may be performed by one or more programmable processors executing a computer program to perform functions by operating on input data and generating output. The one or more programmable processors may execute instructions in parallel, and/or may be arranged in a distributed configuration for distributed processing. Example functionality discussed herein may also be performed by, and an apparatus may be implemented, at least in part, as one or more hardware logic components. For example, and without limitation, illustrative types of hardware logic components that may be used may include Field-programmable Gate Arrays (FPGAs), Program-specific Integrated Circuits (ASICs), Program-specific Standard Products (ASSPs), System-on-a-chip systems (SOCs), Complex Programmable Logic Devices (CPLDs), etc.

Processors suitable for the execution of a computer program include, by way of example, both general and special purpose microprocessors, and any one or more processors of any kind of digital computer. Generally, a processor will receive instructions and data from a read only memory or a random access memory or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto optical disks, or optical disks. Information carriers suitable for embodying computer program instructions and data include all forms of nonvolatile memory, including by way of example semiconductor memory devices, e.g., EPROM, EEPROM, and flash memory devices; magnetic disks, e.g., internal hard disks or removable disks; magneto optical disks; and CD ROM and DVD-ROM disks. The processor and the memory may be supplemented by, or incorporated in special purpose logic circuitry.

To provide for interaction with a user, implementations may be implemented on a computer having a display device, e.g., a cathode ray tube (CRT), liquid crystal display (LCD), or plasma monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback. For example, output may be provided via any form of sensory output, including (but not limited to) visual output (e.g., visual gestures, video output), audio output (e.g., voice, device sounds), tactile output (e.g., touch, device movement), temperature, odor, etc.

Further, input from the user can be received in any form, including acoustic, speech, or tactile input. For example, input may be received from the user via any form of sensory input, including (but not limited to) visual input (e.g., gestures, video input), audio input (e.g., voice, device sounds), tactile input (e.g., touch, device movement), temperature, odor, etc.

Further, a natural user interface (NUI) may be used to interface with a user. In this context, a "NUI" may refer to any interface technology that enables a user to interact with a device in a "natural" manner, free from artificial constraints imposed by input devices such as mice, keyboards, remote controls, and the like.

Examples of NUI techniques may include those relying on speech recognition, touch and stylus recognition, gesture recognition both on a screen and adjacent to the screen, air gestures, head and eye tracking, voice and speech, vision, touch, gestures, and machine intelligence. Example NUI technologies may include, but are not limited to, touch sensitive displays, voice and speech recognition, intention and goal understanding, motion gesture detection using depth cameras (e.g., stereoscopic camera systems, infrared camera systems, RGB (red, green, blue) camera systems and combinations of these), motion gesture detection using accelerometers/gyroscopes, facial recognition, 3D displays, head, eye, and gaze tracking, immersive augmented reality and virtual reality systems, all of which may provide a more natural interface, and technologies for sensing brain activity using electric field sensing electrodes (e.g., electroencephalography (EEG) and related techniques).

Implementations may be implemented in a computing system that includes a back end component, e.g., as a data server, or that includes a middleware component, e.g., an application server, or that includes a front end component, e.g., a client computer having a graphical user interface or a Web browser through which a user can interact with an implementation, or any combination of such back end, middleware, or front end components. Components may be interconnected by any form or medium of digital data communication, e.g., a communication network. Examples of communication networks include a local area network (LAN) and a wide area network (WAN), e.g., the Internet.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims. While certain features of the described implementations have been illustrated as described herein, many modifications, substitutions, changes and equivalents will now occur to those skilled in the art. It is, therefore, to be understood that the appended claims are intended to cover all such modifications and changes as fall within the scope of the embodiments.

What is claimed is:

1. A system comprising:
   a device that includes at least one hardware device processor, and
   a computer readable storage medium storing instructions for execution by the at least one hardware device processor, the instructions, when executed, causing one or more of the at least one hardware device processor to:
   determine, local to the device, user profile attributes associated with a device user based on interaction of the device user with the device, based on device-local monitoring of device user interactions with the device, and to store the user profile attributes in a memory, the user profile attributes determined by a profiling service configured as an augmentation to a device operating system of the device;
   determine, local to the device, a personalized user profile representation associated with the device user based on the user profile attributes; and
   manage exposure of information associated with the determined personalized user profile representation to one or more applications operating locally on the device, while maintaining underlying user data that is used for determining the personalized user profile representation, private to the device operating system of the device, and from the one or more applications.

2. The system of claim 1, wherein:
   the device includes a mobile device, and
   the device operating system includes a mobile device operating system.

3. The system of claim 1, wherein the personalized user profile representation is determined by a personalization service that is configured as one or more of:
   an augmentation to the device operating system, or
   a service implemented within one or more individual applications embedded on the device.

4. The system of claim 1, wherein:
   the management of the exposure of the information includes providing one or more personalization application program interfaces (APIs) that expose information associated with the obtained user profile attributes to one or more applications running on the device.

5. The system of claim 3, wherein:
   at least one of the one or more applications operating locally on the device is configured for modification to interact with at least one of the APIs to provide content personalized to the device user.

6. The system of claim 1, wherein the instructions, when executed, cause one or more of the at least one hardware device processor to:
   determine personalized content for the device user based on the obtained user profile attributes, and
   perform, via a privileged service, automatic personalization within the device operating system.

7. The system of claim 1, wherein the instructions, when executed, cause one or more of the at least one hardware device processor to:
   obtain an encrypted user interest profile based on the obtained user profile attributes and initiate transmission of the encrypted user interest profile for backup storage on one or more other devices that are external to the device.

8. The system of claim 1, wherein:
at least one of the applications operating locally on the device interacts with one or more privacy filters that prevent private information exposure.

9. The system of claim 1, wherein the instructions, when executed, cause one or more of the at least one hardware device processor to:
parse and classify a plurality of streams of data that include information related to the device user, within the device operating system of the device.

10. The system of claim 9, wherein the instructions, when executed, cause one or more of the at least one hardware device processor to:
perform personal preference mining operations by parsing and classifying the plurality of streams of data, the personal preference mining including one or more of:
location mining,
browser history mining,
electronic mail (email) mining, or
Short Message Service (SMS) mining.

11. The system of claim 9, wherein:
the plurality of streams of data include one or more of:
a user electronic mail (email) stream of data,
a Short Message Service (SMS) stream of data,
a social network stream of data, or
a network communication stream of data.

12. The system of claim 1, wherein the instructions, when executed, cause one or more of the at least one hardware device processor to:
control an ad library manager interacting with one or more privacy filters, local to the device, to expose personalized information of the device user to one or more ad library components embedded on the device, without exposure to the one or more ad library components of information determined as sensitive to the device user, and
obtain, via a user selection interface, one or more user preferences indicating one or more device user permissions associated with information associated with the device user.

13. The system of claim 1, wherein:
the device operating system is augmented with a personalization platform that determines, local to the device, the personalized user profile representation that includes a personalized user profile associated with the device user based on interaction of the device user with the device, based on device-local monitoring of device/user interactions, and that stores the personalized user profile in the memory.

14. A method comprising:
determining, local to a device, a personalized user profile associated with a device user based on interaction of the device user with the device, based on device-local monitoring of device operating system activities, and
storing the personalized user profile in a memory, via a personalization platform configured as an augmentation to a device operating system of the device; and
managing exposure of the determined personalized user profile to one or more applications operating locally on the device, without exposure to the applications of information determined as sensitive to the device user, maintaining underlying user data that is used for determining the personalized user profile, private to the device operating system of the device, and from the one or more applications.

15. The method of claim 14, wherein:
managing the exposure includes managing the exposure based on one or more personalization application program interfaces (APIs) configured to expose information associated with the personalized user profile to the one or more applications.

16. The method of claim 14, wherein:
determining the personalized user profile includes determining an approximation of one or more personal attributes associated with the device user, and
the personalized user profile includes one or more weighted persona profiles associated with the device user, the weighted persona profiles having representations based on one or more Bayesian classifiers.

17. The method of claim 14, further comprising:
determining at least one skin for association with at least one device application, based on the personalized user profile.

18. The method of claim 14, further comprising:
determining a personalized display of items associated with interaction of the device user with the device, based on the personalized user profile, wherein
the personalized display of items includes one or more of:
an ordering of presentation of list items, wherein the ordering is based on preferences that are determined based on the personalized user profile associated with the device user,
text displayed with boldly displayed features, for text that is determined as having a high relevance to the personalized profile,
text displayed as highlighted text, for text that is determined as having a high relevance to the personalized user profile,
text displayed with dimly displayed features, for text that is determined as having low relevance to the personalized user profile, or
a graphical display of the items, with a first color applied to at least a first portion of the items, and a second color applied to at least a second portion of the items, wherein the first and second colors are selected based on the personalized user profile, wherein:
the personalized display of items includes one or more of:
visual graphical text display,
audio display,
tactile display, or
sensory display.

19. A computer program product comprising a hardware computer-readable storage medium storing executable code that causes at least one data processing apparatus to:
determine, via a device processor, local to a device having a device-local operating system, user profile attributes associated with a device user based on interaction of the device user with the device, based on device-local monitoring of device operating system activities associated with actions of the device user;
store the user profile attributes in a memory; and
expose personalization information of the device user to one or more ad library components embedded on the device, without exposure to the one or more ad library components of information determined as sensitive to the device user, via interaction with one or more privacy filters, local to the device, maintaining underlying user data that is used for determining the determined personalized user profile attributes, private to the device-local operating system, and private from the one or more ad library components.

20. The computer program product of claim 19, wherein:
the ad library components are isolated from other application code for minimization of leaks of information determined as sensitive to the device user.

* * * * *